United States Patent
Murdoch et al.

(10) Patent No.: US 12,309,286 B2
(45) Date of Patent: *May 20, 2025

(54) TRUSTED CUSTODY CHAIN FOR VERIFIABLE CLAIMS

(71) Applicant: Microsoft Technology Licensing, LLC, Redmond, WA (US)

(72) Inventors: Brandon Brian Murdoch, Reading (GB); Ankur Patel, Sammamish, WA (US); Eric Christopher Sachs, Woodside, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,062

(22) Filed: Aug. 31, 2023

(65) Prior Publication Data

US 2024/0250830 A1 Jul. 25, 2024

Related U.S. Application Data

(63) Continuation of application No. 17/334,869, filed on May 31, 2021, now Pat. No. 11,804,966.

(51) Int. Cl.
*H04L 9/40* (2022.01)
*H04L 9/32* (2006.01)
*H04L 9/00* (2022.01)

(52) U.S. Cl.
CPC .............. *H04L 9/3247* (2013.01); *H04L 9/50* (2022.05)

(58) Field of Classification Search
CPC ................................. H04L 9/3247; H04L 9/50
See application file for complete search history.

(56) References Cited

U.S. PATENT DOCUMENTS

| | | | | |
|---|---|---|---|---|
| 9,619,764 | B2 * | 4/2017 | Dlott | G06Q 10/063 |
| 10,530,756 | B1 * | 1/2020 | Youngs | H04W 12/08 |
| 10,938,569 | B2 * | 3/2021 | Yang | H04L 9/3271 |
| 11,502,847 | B2 * | 11/2022 | Young | G16H 10/40 |
| 2016/0364787 | A1 * | 12/2016 | Walker | H04L 9/0891 |
| 2017/0109759 | A1 * | 4/2017 | Korb | G06F 21/10 |
| 2020/0042958 | A1 * | 2/2020 | Soundararajan | G06Q 20/401 |
| 2021/0182801 | A1 * | 6/2021 | O'Brien | H04L 9/3239 |
| 2021/0288974 | A1 * | 9/2021 | Murdoch | H04L 9/3213 |

(Continued)

OTHER PUBLICATIONS

U.S. Appl. No. 17/334,869, filed May 31, 2021.

(Continued)

*Primary Examiner* — Ghodrat Jamshidi
(74) *Attorney, Agent, or Firm* — Workman Nydegger

(57) ABSTRACT

A first chain of custody verifiable claim is received by a second entity from a first entity. The first chain of custody verifiable claim is signed by the first entity and specifies that an object was in the custody of the first entity. A distributed ledger is accessed to verify the first chain of custody verifiable claim. A second chain of custody verifiable claim is generated that embeds the first chain of custody verifiable claim and is signed by the second entity. The second chain of custody verifiable claim is recorded on the distributed ledger. The second chain of custody verifiable claim is provided to a third entity. The second chain of custody verifiable claim is configured to specify to the third entity that the object was in the custody of the second entity.

20 Claims, 17 Drawing Sheets

(56) References Cited

U.S. PATENT DOCUMENTS

| | | | | |
|---|---|---|---|---|
| 2021/0328780 A1* | 10/2021 | Yang | ..................... | H04L 63/108 |
| 2021/0385216 A1* | 12/2021 | Khalil | ....................... | H04L 9/50 |
| 2022/0138688 A1* | 5/2022 | Schornack | ............. | G06Q 10/10 |
| | | | | 705/317 |
| 2022/0272085 A1* | 8/2022 | Novotny | ............... | H04L 63/126 |
| 2023/0095123 A1* | 3/2023 | Fournier | ............. | G06F 21/6245 |
| | | | | 713/176 |
| 2024/0079104 A1* | 3/2024 | Maeda | ............... | G06Q 20/3678 |

OTHER PUBLICATIONS

Communication pursuant to Rules 161(1) and 162 received for European Application No. 22725633.6 mailed on Jan. 9, 2024, 3 pages.

* cited by examiner

TRUSTED CUSTODY CHAIN FOR VERIFIABLE CLAIMS

CROSS REFERENCE TO RELATED APPLICATIONS

This application is a continuation of and claims benefit from U.S. application Ser. No. 17/334,869, entitled "TRUSTED CUSTODY CHAIN FOR VERIFIABLE CLAIMS", which was filed on May 31, 2021, and the entire contents of which are incorporated by reference in their entirety.

BACKGROUND

A digital identity is a mechanism to keep track of an entity across different digital contexts. After an identity is determined, appropriate action can be taken related to the entity that has the identity. As an example, authorizations, privileges, customizations, and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles, and privileges. Centralized identity management systems have been deemed as secure since they often use professionally maintained hardware and software. Typically, the identity issuing organization sets the terms and requirements for registering people with the organization.

When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computing technologies provide for a data structure called a "verifiable claim or credential". In these technologies, a claims issuer makes one or more claims about a subject, and generates the verifiable claim. The verifiable claim include those claim(s) as well as proof instructions to prove that claim(s) have not been tampered with and were indeed issued by the claims issuer. The verifiable claim also often includes duration information metadata that defines a period of time that the verifiable claim is valid for use or that defines a specific number of times that the verifiable claim is authorized for use. In a decentralized environment, the verifiable claim also include a DID of the claims issuer. The claims issuer then provides the verifiable claim to a claims holder, for presentation to any relying party that relies upon the veracity of those claims.

As an example, the claims issuer might be a computing system associated with a government agency in charge of issuing driver licenses. The government agency computing system computing system may generate a verifiable claim with claims about a citizen, such as the birthdate, residence address, weight, eye color, hair color, authorization to drive, restrictions on authorization to drive, and so forth. The government agency computing system issues the verifiable claim to the citizen. If the citizen is stopped by law enforcement, a computing system of the citizen may present the verifiable claim, whereby a computing system associated with law enforcement may use the proof instructions to verify that the claims were issued by the government agency and indeed have not been tampered with since issuance. In another example, an organization that provides inoculations computing system may issue claims to a parent of a child that assert that the child has received certain inoculations. The computing system of the parent may then present these inoculation claims to a school where the child is to attend. In the above examples, the relying party was the law enforcement agency and the school the child attends or more specifically, the computing system of the law enforcement agency and the school.

Some verifiable claims are directed toward a specific object that is considered to have value and that is able to be bought and sold by various entities. For example, such object may be a digital or physical piece of art or an antique item such as furniture or a car. Thus, a first entity may create the object. Alternatively, the first entity may be an entity such as an art broker who is able to validate that the object is authentic. The first entity may then sell the object to a second entity. Since the second entity received the object either from its creator or from the entity such as art broker, the second entity will typically have high confidence that the object is authentic. However, at a later date the second entity may choose to sell the object to a third entity, who may in turn sell the object to a fourth entity and so on.

As the chain of custody from the first entity grows longer, it can become increasing difficult for a buying entity to know if the object is authentic. For example, at some point in time an entity may try to sell a fraudulent version of the object. Alternatively, an entity that does not have possession of the object may try to assert that he or she does have possession and may try to use this to initiate a fraudulent sale. The buying entity is often left with no way to ascertain if the object is authentic and if the selling entity has the object in his or her possession.

The embodiments presented herein provide a novel solution to the above discussed problem. The embodiments presented herein allow for a chain of custody of the object to be recorded on a distributed ledger. This chain of custody can then be accessed and verified by each subsequent buyer to help ensure that the object they are buying is authentic. For example, a first entity can generate a first chain of custody verifiable claim and then record this (or at least a representation of the verifiable claim) on the block chain. When a second entity wants to buy the object, the distributed ledger can be accessed, and the first chain of custody verifiable claim can be verified. Once first chain of custody verifiable claim is verified, the second entity can have confidence that het object is authentic before buying it.

The second entity can then generate a second chain of custody verifiable claim that embeds the first chain of custody verifiable claim then record this on the distributed ledger. When a third entity wants to buy the object, the distributed ledger can be accessed, and both the second chain of custody verifiable claim and the embedded first chain of custody verifiable claim can be verified. Once first and second chain of custody verifiable claims are verified, the third entity can have confidence that het object is authentic before buying it. The process of generating and embedding additional chain of custody verifiable claims and recording these on the distributed ledger can occur every time the object changes ownership and thus created confidence for all subsequent buyers.

In one embodiment a first chain of custody verifiable claim is received by a second entity from a first entity. The first chain of custody verifiable claim is signed by the first entity and specifies that an object was in the custody of the first entity at the time that the first chain of custody verifiable claim is received. A distributed ledger is accessed to verify the first chain of custody verifiable claim. A second chain of custody verifiable claim is generated. The second chain of custody verifiable claim embeds the first chain of custody verifiable claim therein and is signed by the second entity. At least a portion of the second chain of custody verifiable claim is recorded on the distributed ledger. The second chain of custody verifiable claim is provided to a third entity. The second chain of custody verifiable claim is configured to specify to the third entity that the object was in the custody of the second entity at the time that the second chain of custody verifiable claim is provided to the third entity.

In one embodiment, a first chain of custody verifiable claim related to an object is received by a third entity from a first entity. The first chain of custody verifiable claim includes a first signature generated by the first entity and embeds a second chain of custody verifiable claim related to the object that was received by the first entity from a second entity. The second chain of custody verifiable claim includes a second signature generated by the second entity. A distributed ledger is accessed to verify the first chain of custody verifiable claim. Verification of the first chain of custody verifiable claim indicates that the first entity had proper custody of the object at the time the first chain of custody verifiable claim was received by the third entity. Upon successful verification of the first chain of custody verifiable claim, the distributed ledger is accessed to verify the second chain of custody verifiable claim. Verification of the second chain of custody verifiable claim indicates that the second entity had proper custody of the object at the time the second chain of custody verifiable claim was received by the first entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
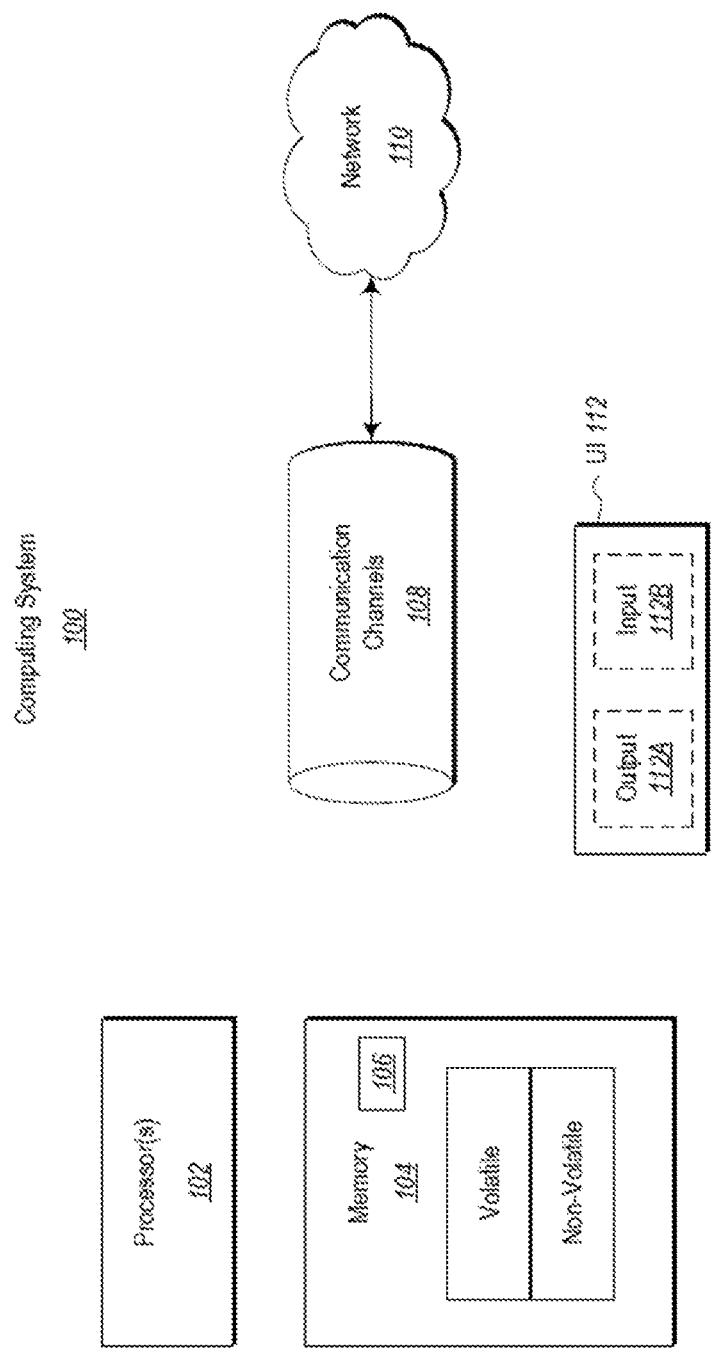
FIG. 1 illustrates an example computing system in which the principles described herein may be employed.

In one embodiment a first chain of custody verifiable claim is received by a second entity from a first entity. The first chain of custody verifiable claim is signed by the first entity and specifies that an object was in the custody of the first entity at the time that the first chain of custody verifiable claim is received. A distributed ledger is accessed to verify the first chain of custody verifiable claim. A second chain of custody verifiable claim is generated. The second chain of custody verifiable claim embeds the first chain of custody verifiable claim therein and is signed by the second entity. At least a portion of the second chain of custody verifiable claim is recorded on the distributed ledger. The second chain of custody verifiable claim is provided to a third entity. The second chain of custody verifiable claim is configured to specify to the third entity that the object was in the custody of the second entity at the time that the second chain of custody verifiable claim is provided to the third entity.

In one embodiment, a first chain of custody verifiable claim related to an object is received by a third entity from a first entity. The first chain of custody verifiable claim includes a first signature generated by the first entity and embeds a second chain of custody verifiable claim related to the object that was received by the first entity from a second entity. The second chain of custody verifiable claim includes a second signature generated by the second entity. A distributed ledger is accessed to verify the first chain of custody verifiable claim. Verification of the first chain of custody verifiable claim indicates that the first entity had proper custody of the object at the time the first chain of custody verifiable claim was received by the third entity. Upon successful verification of the first chain of custody verifiable claim, the distributed ledger is accessed to verify the second chain of custody verifiable claim. Verification of the second chain of custody verifiable claim indicates that the second entity had proper custody of the object at the time the second chain of custody verifiable claim was received by the first entity.

Because the principles described herein is performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

As illustrated in FIG. 1, in its most basic configuration, a computing system 100 typically includes at least one hardware processing unit 102 and memory 104. The hardware processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processing unit 102 and memory 104, as needed to perform their various functions.

Figure 2:
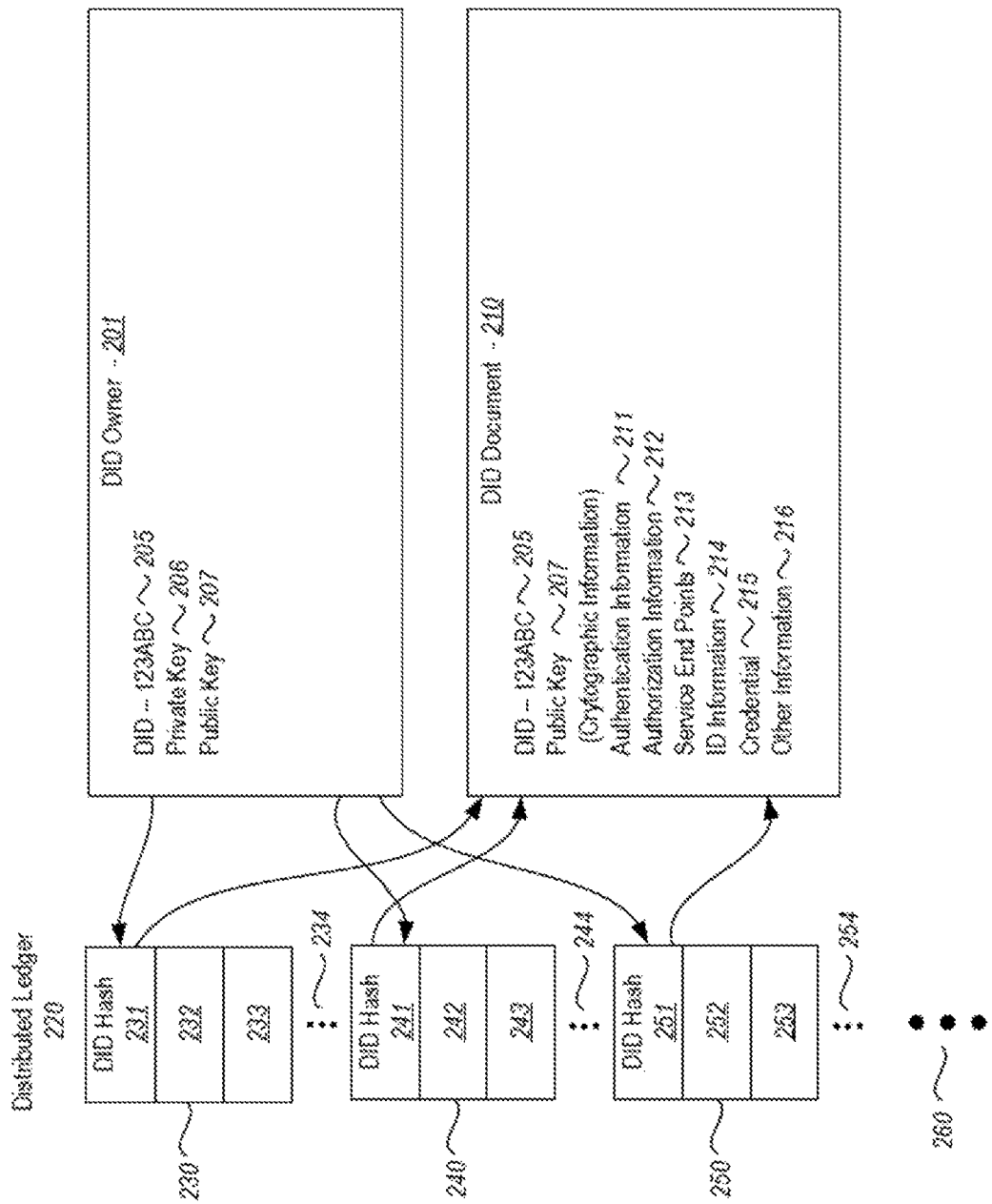
FIG. 2 illustrates an example environment for creating a decentralized identification or identifier (DID)

Some introductory discussions of a decentralized identification (DID) and the environment in which they are created and reside will now be given with respect to FIG. 2, which illustrates a decentralized network 200. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system, or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus its DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which may also be referred to herein as an attestation. The credential information 215 (also referred to as a verifiable claim) is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID owner 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
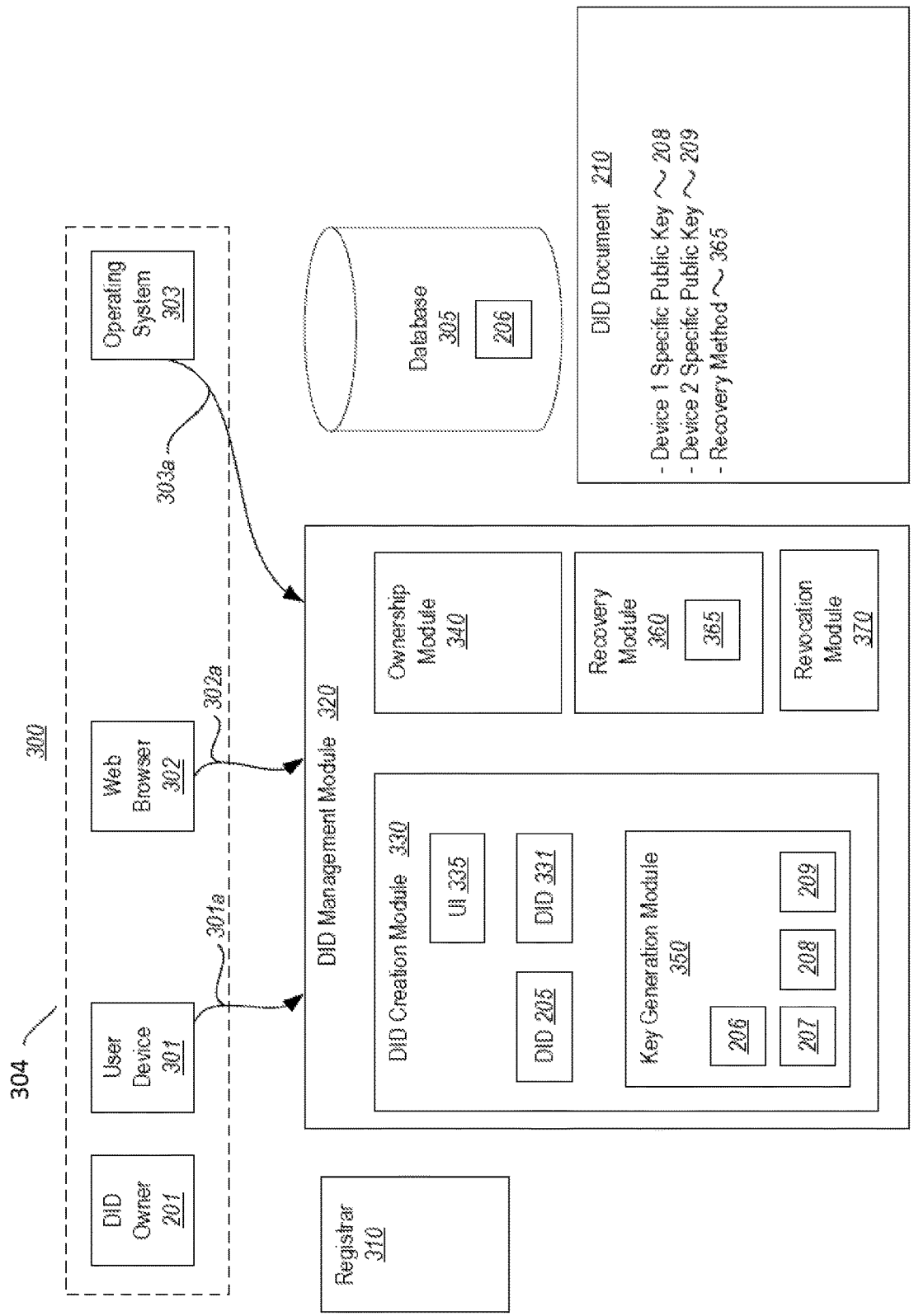
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 reference elements from FIG. 2 as needed for ease of explanation.

As shown in FIG. 3, the computing system environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing abilities. The user device 301 includes a web browser 302 operating on the device and an operating system 303 operating the device. More broadly speaking, the dashed line 304 represents that all of these devices are owned or otherwise under the control of the DID owner 201.

The computing system environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the DID management module 320 is referred to as a "digital wallet" or a "user agent". It will be appreciated by one of skill in the art, however, that a digital wallet or user agent can be implemented in a computing system other than the DID management module 320 in other embodiments.

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompt for the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per user device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the DID creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, web browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 is one of the identity hubs 410 described below with respect to FIG. 4. A storage module 380 is configured to store data (such as the private key 206 or the credential information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
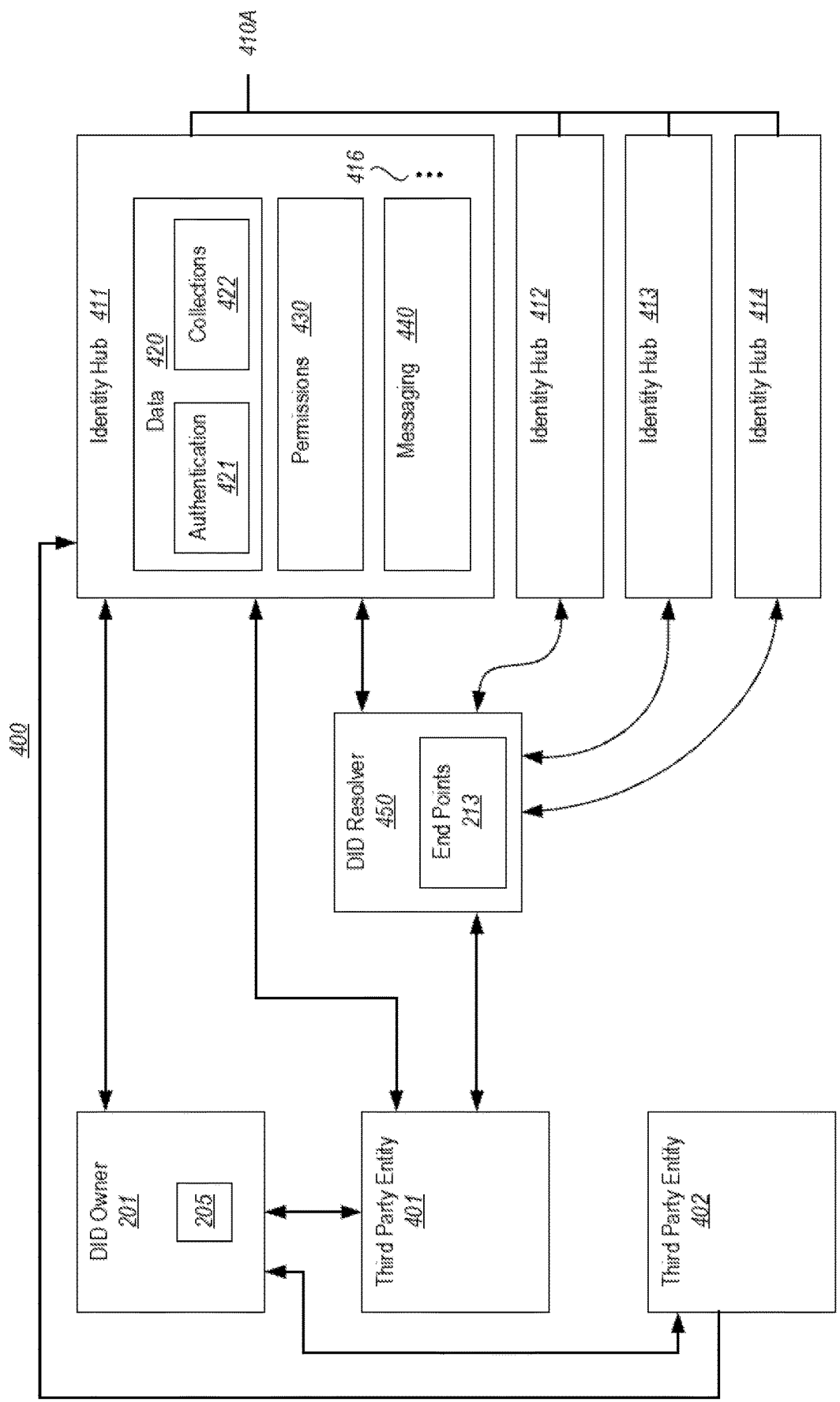
FIG. 4 illustrates an example decentralized personal storage or identity hub.

FIG. 4 illustrates an embodiment of a computing system environment 400 in which a DID such as DID 205 is utilized. Specifically, the computing system environment 400 is used to describe the use of the DID 205 in relation to one or more decentralized stores or identity hubs 410 that are each under the control of the DID owner 201 to store data belonging to or regarding the DID owner 201. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 are multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is in the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be medical records data that corresponds to a specific protocol for medical data. The collection 422 also includes other types of data, such as credential information 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 are able to decrypt this data. With respect to data stored by the storage module 380, these settings 421 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data stored in data storage 420. Alternatively, the DID owner 201 allows access to his or her doctor for any medical records. It will be appreciated that the DID owner 201 is able to give permission to any number of third parties to access a subset of the data stored in data storage 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new user device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password, or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party 401 so that the third-party is able to access data or services stored on the identity hub 411. For example, the DID owner 201 is a human who is at a scientific conference who desires to allow the third-party 401, who is also a human, access to his or her research data. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes a service end point 213 that is an address or pointer to services associated with the decentralized identity.

Completing the research data example, the third-party 401 sends a message to the messaging module 440 asking for permission to access the research data. The messaging module 440 sends a message to the DID owner 201 asking if the third-party 401 should be given access to the research data. Because the DID owner desires to provide access to this data, the DID owner 201 allows permission to the third-party 401 and this permission is recorded in the permissions 430.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims (e.g., credential information 215) are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Figure 5:
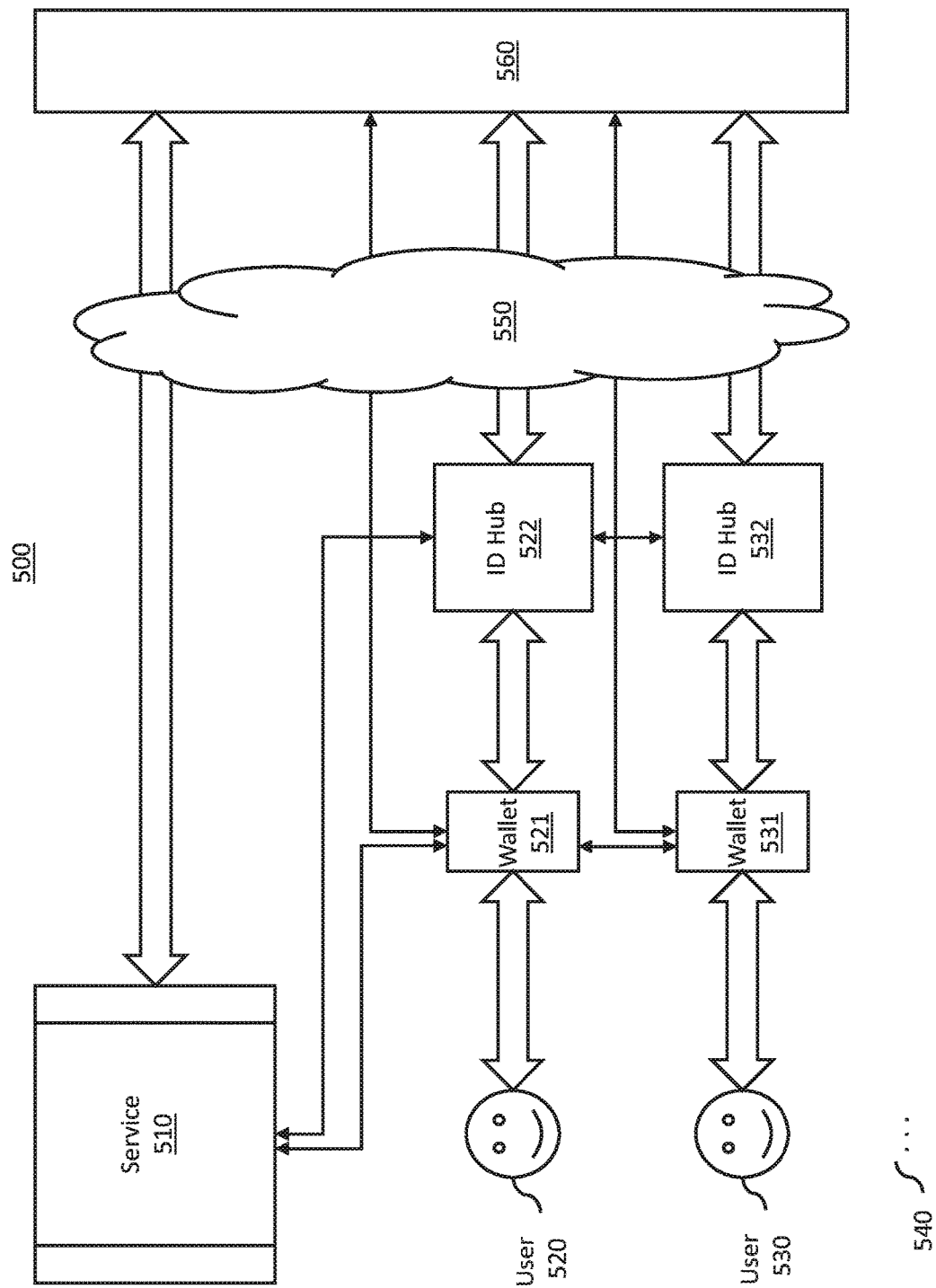
FIG. 5 illustrates an example environment, in which the principles described herein are implemented.

Having described DIDs and how they operate generally with reference to FIGS. 2-4, specific embodiments of decentralized identification will now be explained. Turning to FIG. 5, a decentralized environment 500 that allows DID owners to access services and perform transactions with other DID owners while identifying themselves will now be explained. It will be appreciated that FIG. 5 references elements from FIGS. 2-4 as needed for ease of explanation.

As illustrated in FIG. 5, the decentralized environment 500 includes a device associated with a service provider 510, a wallet apps 521 and 522 of users 520 and 530 (e.g., DID owners). The ellipsis 540 represents that there may be any number of devices associated with any number of service providers and/or users in the decentralized environment 500. Each of the service provider (s) and users 520, 530 corresponds to a DID owner 201 of FIG. 2. The wallet app 521 or 531 corresponds to the DID management module 320 of FIG. 3. The ID hub 522 or ID hub 532 corresponds to the ID hub 411 of FIG. 4.

User 520 uses a wallet app 521 to manage his/her DIDs, and user 530 uses a wallet app 531 to manage his/her DIDs. The wallet app 521 or 531 is connected to a respective ID hub 522 or 531. Each of the service provider's device 510 and wallet apps 521, 531 has access to the distributed ledger via a computer network 550. In some embodiments, the wallet app 521 or 531 has indirect access to the distributed ledger via the ID hub 522 or 532. In some embodiments, the wallet app 521 or 531 is configured to store a complete copy of the distributed ledger or has direct access to the distributed ledger via the computer network 550.

The device of the service provider 510 and each wallet apps 521, 531 and/or ID hubs 522, 532 are capable of communicating with each other via various communication channels, including, but not limited to, local area network, a wide area network, a BLE beacon signal, and/or near field communication (NFC). The communication can also be performed via generating a bar code or a QR code that by one wallet app 521, and scanning the bar code or a QR code by another wallet app 531 or the device of the service provider 510. The barcode or the QR code includes the identification information related to the user 520, such as the DID associated with the user 520.

In some embodiments, the service 510 may act as an issuer or as a relying party. As used herein, an "issuer" is an entity that makes at least one assertion about a subject. That assertion is also called herein a "claim". A "credential" is a set of one or more claims. Examples of issuers include corporations, organizations, associations, governments, agencies, individuals, or any other entity that can make assertions that could be relied upon by others. Thus, the service 510 may provide one or more verifiable claims or credentials about the user 520 or user 530, who such instance act as a "holder". The users 520 and 530 can store the verifiable claims in the ID hub 522 and ID hub 532, respectively. As used herein, a "relying party" is a party that relies on the verifiable claims or credentials so as to ascertain information about the holder and then provides a service to the holder.

For example, suppose that the service 510 is the Department of Motor Vehicles (DMV). While acting as an "issuer" the service 510 issues a verifiable claim to the user 520 that asserts that the user 520 has a valid driver's license issued by the DMV. The user 520 as the "holder" is then able to provide the verifiable claim related to the driver's license to a relaying party that needs this information. Suppose a relying party (not illustrated in this embodiment, although as mentioned above the service 510 can be a relying party in some embodiments) is a car rental agency. The user 520 presents the verifiable claim related to the driver's license to the car rental agency when he or she wants to rent a car and the car rental agency is able to use the verifiable claim related to the driver's license to ascertain that the user 520 has a valid driver's license that can be used to rent the car.

Figure 6B:
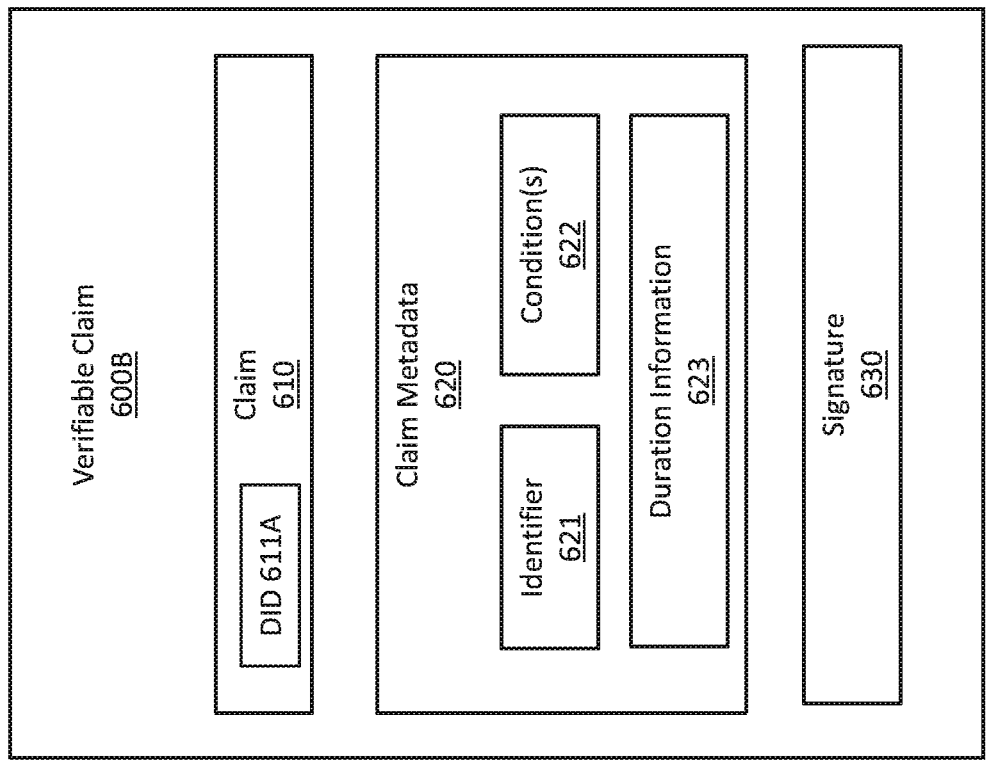
FIG. 6B illustrates an example verifiable claim.
Figure 6A:
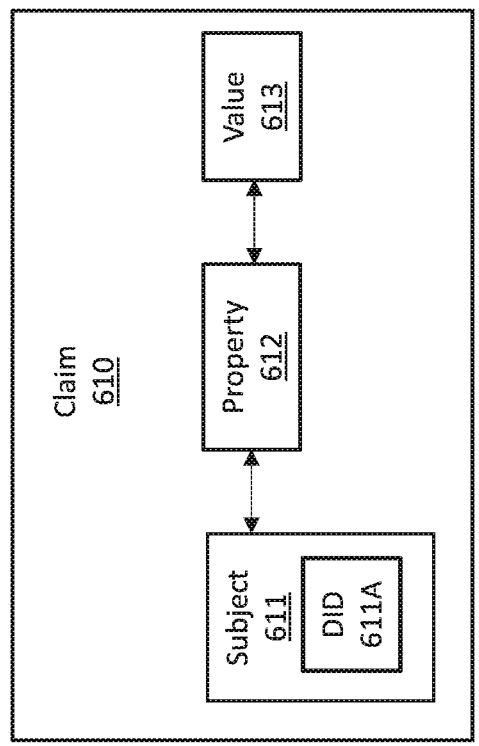
FIG. 6A illustrates an example claim.

FIG. 6A illustrates an example data structure that represents a claim 610. The claim 610 includes a subject 611, a property 612 and a value 613. For example, the subject 611 corresponds to an owner of a DID (e.g., DID owner 201), and a DID 611A corresponding to DID 205 is recorded as part of the subject 611. The property 612 may be any property of the owner of the DID 611A, such as a name, a phone number, an email address, etc. The value 613 is the value of the corresponding property 612. For example, when the property is "name", the value would be the name of the owner of the DID, e.g., John Doe; when the property is "phone number", the value would be the phone number of the owner of the DID, e.g., 1-800-123-4567.

FIG. 6B illustrates an example data structure of a verifiable claim or credential 600B. In some embodiments, the data structure of the verifiable claim or credential is referred to as a Portable Identity Card (PIC) and is way for the issuer (e.g., service 510) to organize the verifiable claim or credential in a manner that is easily understood by the user (e.g., user 520 or user 530). The verifiable claim or credential 600B includes claim 610, which corresponds to the claim 610 of FIG. 6A and includes the DID 611A. The verifiable claim or credential 600B also includes a signature 630, which is generated by signing the verifiable claim or credential 600B by a private key of the issuer. The signature 630 is typically a cryptographic mechanism (such as a digital signature) that is used to detect whether the verifiable claim or credential 600B has been tampered with since the time that the verifiable claim or credential 600B was issued, and can be used to verify identity of the issuer of the verifiable claim or credential 600B.

Once the verifiable claim or credential 600B is generated, at least a portion of data related to the verifiable claim or credential 600B is propagated onto a distributed ledger (e.g., 220, 560), such that a relying entity can use the portion of data propagated onto the distributed ledger to verify the verifiable claim or credential 600B. In some embodiments, the public key corresponding to the private key of the issuer is propagated onto the distributed ledger. In some embodiments, a hash of the public key or a hash of the verifiable claim or credential 600B is propagated onto the distributed ledger.

In some embodiments, the verifiable claim or credential 600B also includes various metadata 620 related to the verifiable claim or credential 600B. For example, the metadata includes, but is not limited to, (1) a unique identifier 621 identifying the corresponding verified claim or credential, (2) one or more conditions 622 for accessing the verifiable claim or credential 600B, or (3) duration information metadata 623 related to a duration of time that the issuer wants the verifiable claim or credential 600B to be valid for or useable for.

The one or more conditions metadata 622 for accessing the verifiable claim or credential 600B, include but are not limited to, (1) requiring the relying entity to pay a predetermined amount of cryptocurrency or type of currency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service.

The duration information metadata 623 includes, but is not limited to, (1) an expiration time of the corresponding verifiable claim or credential 600B, (2) a predetermined number of times that the corresponding verifiable claim or credential 600B can be accessed or used, (3) a mechanism that automatically causes the verifiable claim or credential 600B to expire in response to a directive from the issuer, or (4) a mechanism that allows the user to manually cause the verifiable claim or credential 600B to expire.

Figure 7A:
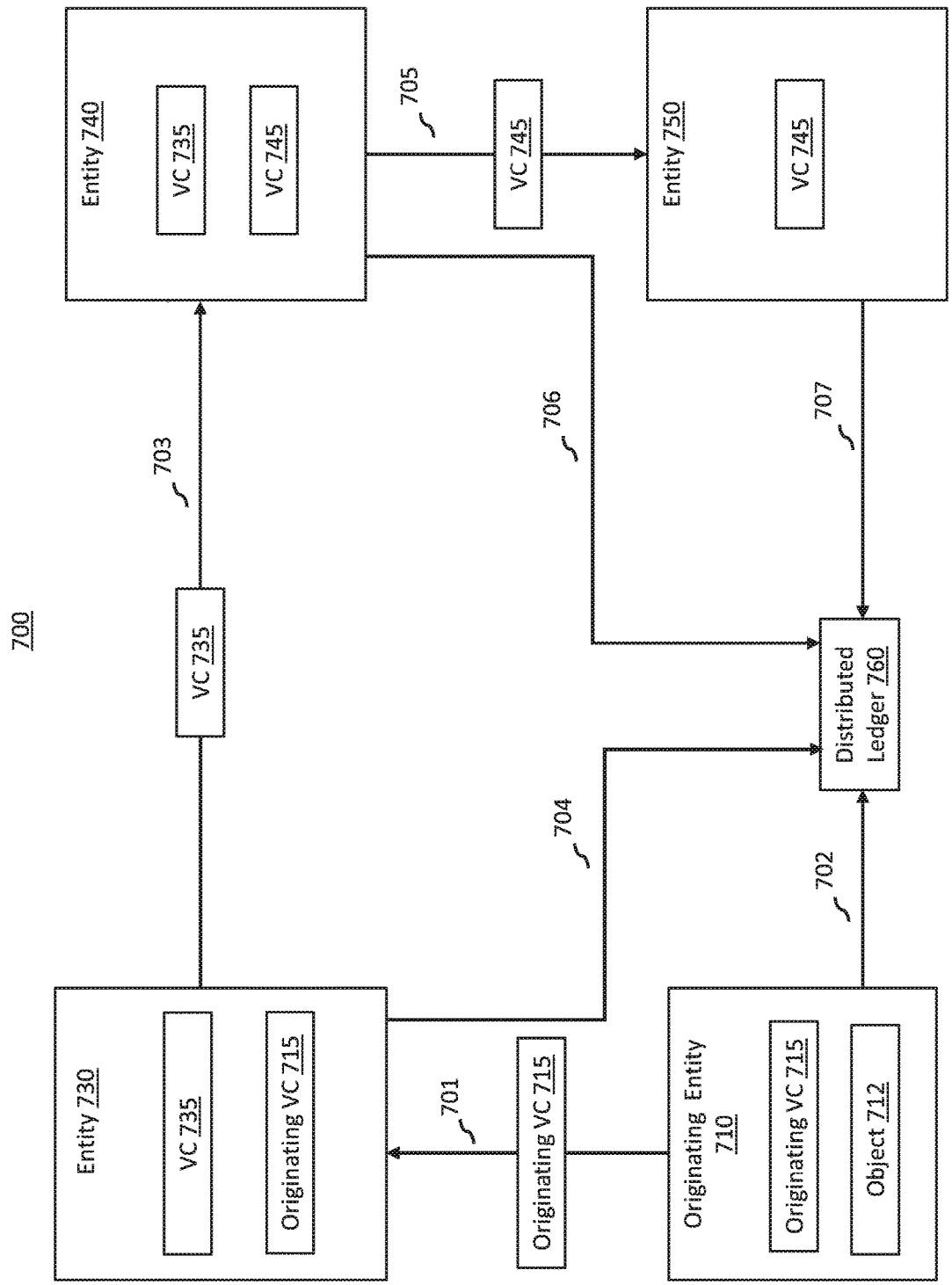
FIG. 7A illustrates an example environment that can be used to log and verify a chain of custody in decentralized network.

FIG. 7A illustrates an embodiment of a computing system environment 700 for recording a chain of custody and verifying the chain of custody in a decentralized network. As illustrated, the environment 700 includes an originating entity 710 that is associated with an object 712. For example, in some embodiments the object 712 is a work of art such as, but not limited to, a picture, a portrait, a sculpture, a musical work, or any other type of work of art. In some embodiments, the work of art is a digital object version such as a digital portrait or digital piece of music. In other embodiments, the work of art is a physical object version such as a physical portrait or piece of music. In some embodiments, the object 712 is a physical object such as a table, a desk, other furniture, a musical instrument, or a vehicle. Although the embodiments disclosed herein are not limited by the type of the object 712, the object 712 will typically be an object that is considered to have value and that can be bought and sold or otherwise transferred from one entity to another entity.

In some embodiments disclosed herein, the originating entity 710 is an entity that creates or generates the object 712. For example, in such embodiments the originating entity 710 may be the artist who creates or generates an object 712 that is either a digital or physical piece of art. In other embodiments, the originating entity 710 is an entity that obtains the object 712 to sale to other entities. For example, in such embodiments the originating entity 710 may be an antique dealer who sells antique furniture or vehicles. Accordingly, the embodiments disclosed herein are not limited by the type of the originating entity 710.

Because the object 712 is typically an object that is considered to have value and that can be bought and sold, it is important to ensure that the object 712 is authentic when it is being bought and sold. This helps to ensure that a particular entity is not trying to sell a fraudulent object 712. Accordingly, the embodiments disclosed herein allow the originating entity or a subsequent selling entity to record a verifiable claim or credential relating to a chain of custody of the object 712 onto a distributed ledger. The buying entity is then able to access the distributed ledger to verify the verifiable claim or credential relating to the object 712. If the verifiable claim or credential relating to the chain of custody of the object 712 is verified, the buying entity can have high confidence that the object 712 is authentic. In some embodiments, the originating entity 710 obtains a DID 712A for the object 712 in the manner previously described. Obtaining a DID for the object 712 further helps to identify the object 712 in the decentralized system and can be helpful in recording and validating the verifiable claim or credential on the distributed ledger.

Accordingly, as shown at 701 in FIG. 7A, a computing system of the originating entity 710 provides an originating chain of custody verifiable claim or credential 715 to a computing system of an entity 730, who is an entity that is buying the object 712 from the originating entity 710. The computing system of the originating entity 710 may generate the originating chain of custody verifiable claim or credential 715 at the time that the entity 730 initiates the buying process.

Figure 7C:
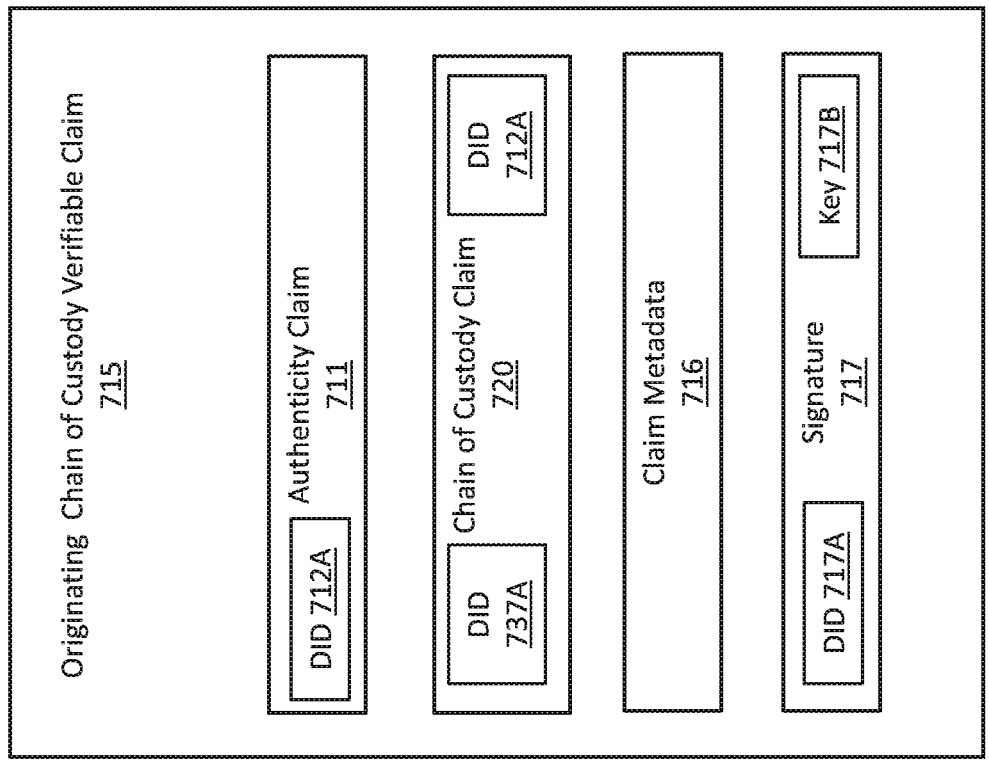
FIG. 7C illustrates an example chain of originating chain of custody verifiable claim.
Figure 7B:
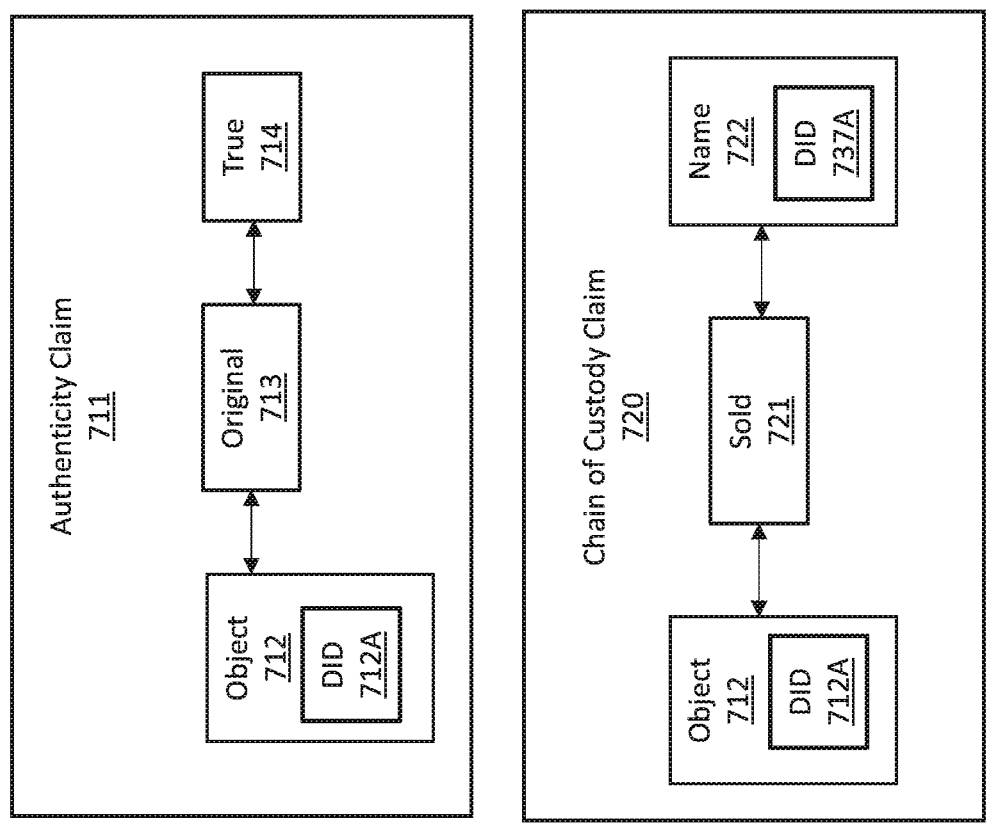
FIG. 7B illustrates an example authenticity and chain of custody claim.

FIG. 7B illustrates an example data structure that represents a chain of custody claim 720 that is made by the originating entity 710. The chain of custody claim 720 includes the object 712 as the subject of the claim, a property 721 that specifies that the object 712 has been sold and a value 722 that lists the name of the entity that is the object 712 is being sold to and an associated DID of that entity. In the illustrated embodiment, it is the entity 730 that the object 712 is being sold to and so the DID 737A that is associated with the entity 730 is included. In addition, the object 712 is shown as being associated with its DID 712A, which may correspond to the DIDs previously discussed.

In some embodiments, in addition to the chain of custody claim 720, the originating entity 710 also makes an authenticity claim 711 regarding the object 712. FIG. 7B illustrates an example data structure that represents the authenticity claim 711 that is made by the originating entity 710. The authenticity claim 711 includes the object 712 and its associated DID 712A as the subject of the claim, a property 713 that specifies that the object 712 is authentic and a value 714 that shows "True" because the object 712 is authentic.

FIG. 7C illustrates an example data structure of the originating verifiable claim or credential 715. The originating chain of custody verifiable claim or credential 715 includes the custody claim 720 and includes the DID 712A of the object 712 and the DID 737A of the entity 730. In some embodiments, the authenticity claim 711 including the DID 712A of the object 712 is also included. The originating chain of custody verifiable claim or credential 715 also includes a signature 717 which is generated by signing the originating chain of custody verifiable claim or credential 715 by a private key of the originating entity 710 that is associated with a DID 717A of the originating entity 710 and is part of key pair with a public key 717B included with the signature 717. The signature 717 is typically a cryptographic mechanism (such as a digital signature) that is used to detect whether the originating chain of custody verifiable claim or credential 715 has been tampered with since the time that the originating chain of custody verifiable claim or credential 715 was issued, and can be used to verify identity of the originating entity 710. In some embodiments, the originating chain of custody verifiable claim or credential 715 also includes claim metadata 716 related to the originating verifiable claim or credential 715. The claim metadata 716 corresponds to the metadata 620 previously discussed.

Once the originating chain of custody verifiable claim or credential 715 is generated, at least a portion of data related to the originating chain of custody verifiable claim or credential 715 is propagated onto a distributed ledger 760 (corresponding to the distributed ledger 220, 560) by the computing system of the originating entity 710 as shown in FIG. 7A at 702, such that a relying entity can use the portion of data propagated onto the distributed ledger to verify the originating verifiable claim or credential 715. For example, in some embodiments the DID 717A or the public key 717B is propagated onto the distributed ledger 760 for use in validating the originating verifiable claim or credential 715. In other embodiments, a hash of the public key 717B or a hash of the originating chain of custody verifiable claim or credential 715 is propagated onto the distributed ledger 760.

As shown in FIG. 7A at 701, the computing system of the entity 730 receives the originating chain of custody verifiable claim or credential 715 from the originating entity 710 once the sale of the object 712 is completed. Although not shown for ease of illustration, it will be appreciated that the entity 730 will also receive the actual object 712 from the originating entity 710 once the sale of the object 712 is completed since the entity 730 now owns the object 712.

Upon receipt of the originating verifiable claim or credential 715, the computing system of the entity 730 can access the distributed ledger 760 as shown at 704 to verify the signature 717 using the DID 717A and/or the public key 717B. In other words, the computing system of the entity 730 will use the DID 717A and/or the public key 717B to ascertain that the multiple entries on the distributed ledger 760 indicate that the signature 717 (or at least a representation of the signature 717) has been properly recorded and has not been tampered with. A successful verification of the signature 717 will verify that the originating entity 710 had proper custody of the object 712 at the time the originating chain of custody verifiable claim or credential 715 was received by the entity 730.

After gaining custody of the object 712, the entity 730 may desire to sale the object 712 to an entity 740. Accordingly, as shown at 703 in FIG. 7A, the computing system of the entity 730 provides a chain of custody verifiable claim or credential 735 to a computing system of the entity 740 to show proper chain of custody to the entity 740. The computing system of the entity 730 may generate the chain of custody verifiable claim or credential 735 at the time that the entity 740 initiates the buying process. Since the entity 730 is "presenting" the chain of custody verifiable claim or credential 735 to the entity 740, the chain of custody verifiable claim or credential 735 may also be referred to as verifiable presentation 735.

Figure 7E:
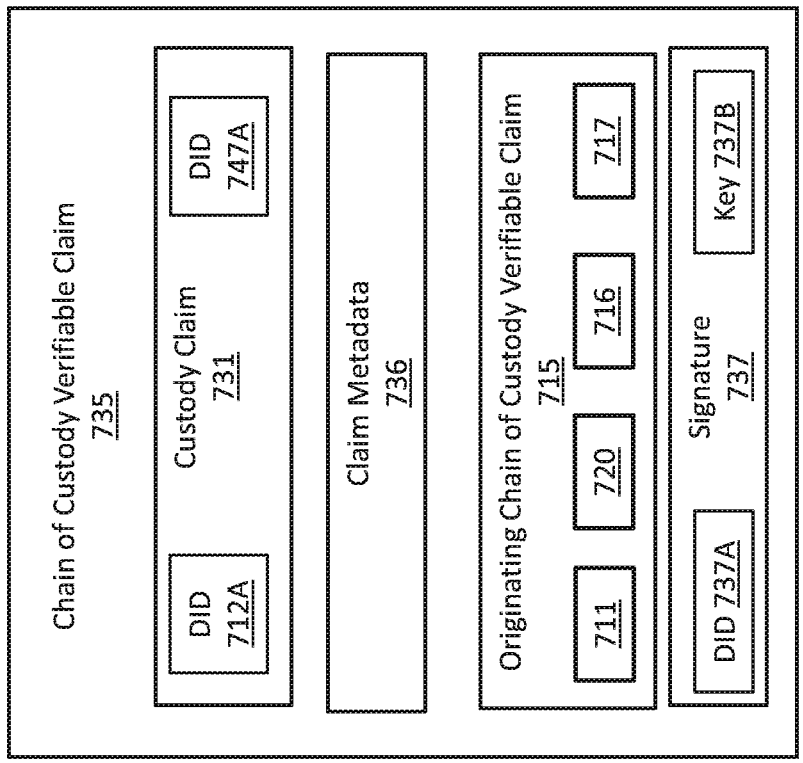
FIG. 7E illustrates an example chain of custody verifiable claim having an originating chain of custody verifiable claim embedded therein.
Figure 7D:
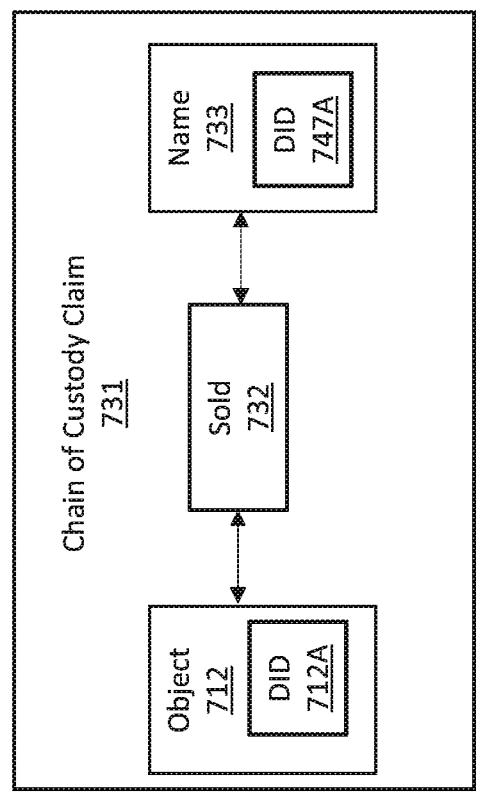
FIG. 7D illustrates another example chain of custody claim.

FIG. 7D illustrates an example data structure that represents a chain of custody claim 731 that is made by the entity 730. The chain of custody claim 731 includes the object 712 and its associated DID 712A as the subject of the claim, a property 732 that specifies that the object 712 has been sold and a value 733 that lists the name of the entity that is the object 712 is being sold to and an associated DID of that entity. In the illustrated embodiment, it is the entity 740 that the object 712 is being sold to and so the DID 747A that is associated with the entity 740 is included.

FIG. 7E illustrates an example data structure of the chain of custody verifiable claim or credential 735. The chain of custody verifiable claim or credential 735 includes the chain of custody claim 731 and includes the DID 712A of the object 712 and the DID 747A of the entity 740. In some embodiments, the chain of custody verifiable claim or credential 735 also includes various metadata 736 related to the chain of custody verifiable claim or credential 735 and which may correspond to the metadata 620 previously discussed. The chain of custody verifiable claim or credential 735 also includes or has embedded therein the originating verifiable claim or credential 715.

The chain of custody verifiable claim or credential 735 also includes a signature 737 which is generated by signing the chain of custody verifiable claim or credential 735 by a private key of the entity 730 that is associated with the DID 737A of the entity 730. The signature 737 is typically a cryptographic mechanism (such as a digital signature) that is used to detect whether the chain of custody verifiable claim or credential 735 has been tampered with since the time that the chain of custody verifiable claim or credential 735 was issued, and can be used to verify identity of the entity 730.

Once the chain of custody verifiable claim or credential 735 is generated, at least a portion of data related to the chain of custody verifiable claim or credential 735 is propagated onto a distributed ledger 760 by the computing system of the entity 730 as shown in FIG. 7A at 704, such that a relying entity can use the portion of data propagated onto the distributed ledger to verify the chain of custody verifiable claim or credential 735. For example, in some embodiments the DID 737A or the public key 737B is propagated onto the distributed ledger 760 for use in validating the chain of custody verifiable claim or credential 735. In other embodiments, a hash of the public key 737B or a hash of the chain of custody verifiable claim or credential 735 is propagated onto the distributed ledger 760.

As shown at 703 in FIG. 7A, the computing system of the entity 740 receives the chain of custody verifiable claim or credential 735 from the entity 730 once the sale of the object 712 is completed. Although not shown for ease of illustration, it will be appreciated that the entity 740 will also receive the actual object 712 from the entity 730 once the sale of the object 712 is completed since the entity 740 now owns the object 712.

Upon receipt of the chain of custody verifiable claim or credential 735, the computing system of the entity 740 can access the distributed ledger 760 as shown at 706 to verify the signature 737 using the DID 737A and/or the public key 737B. In other words, the computing system of the entity 740 will use the DID 737A and/or the public key 737B to ascertain that the multiple entries on the distributed ledger 760 indicate that the signature 737 (or at least a representation of the signature 737) has been properly recorded and has not been tampered with or revoked.

However, validating the signature 737 by itself would not necessarily verify that the entity 730 has had proper custody of the object 712. For example, it is possible that the entity 730 is trying to sell a forged version of the object 712 and has thus fraudulently generated the chain of custody verifiable claim or credential 735 to fool the entity 740. Accordingly, the computing system of the entity 740 can also access the distributed ledger as shown at 706 to verify the signature 717 of the originating chain of custody verifiable claim or credential 715 that is embedded in the chain of custody verifiable claim or credential 735 using the DID 717A and/or the public key 717B. As discussed previously, verifying the signature 717 shows that the originating chain of custody verifiable claim or credential 715 has not been tampered with since such tampering would cause the verification of the signature to fail. In addition, verifying the signature 717 shows that the endorsement originating chain of custody verifiable claim or credential 715 has not been revoked as such revocation would likely be recorded on the distributed ledger 760. Thus, a successful verification of the signatures 717 and 737 will verify that the entity 730 had proper custody of the object 712 at the time the chain of custody verifiable claim or credential 735 was received by the entity 740.

After gaining custody of the object 712, the entity 740 may desire to sale the object 712 to an entity 750. Accordingly, as shown at 705 in FIG. 7A, the computing system of the entity 740 provides a verifiable claim or credential 745 to a computing system of the entity 750. The computing system of the entity 740 may generate the verifiable claim or credential 745 at the time that the entity 730 initiates the buying process. Since the entity 740 is "presenting" the chain of custody verifiable claim or credential 745 to the entity 750, the chain of custody verifiable claim or credential 745 may also be referred to as verifiable presentation 745.

Figure 7G:
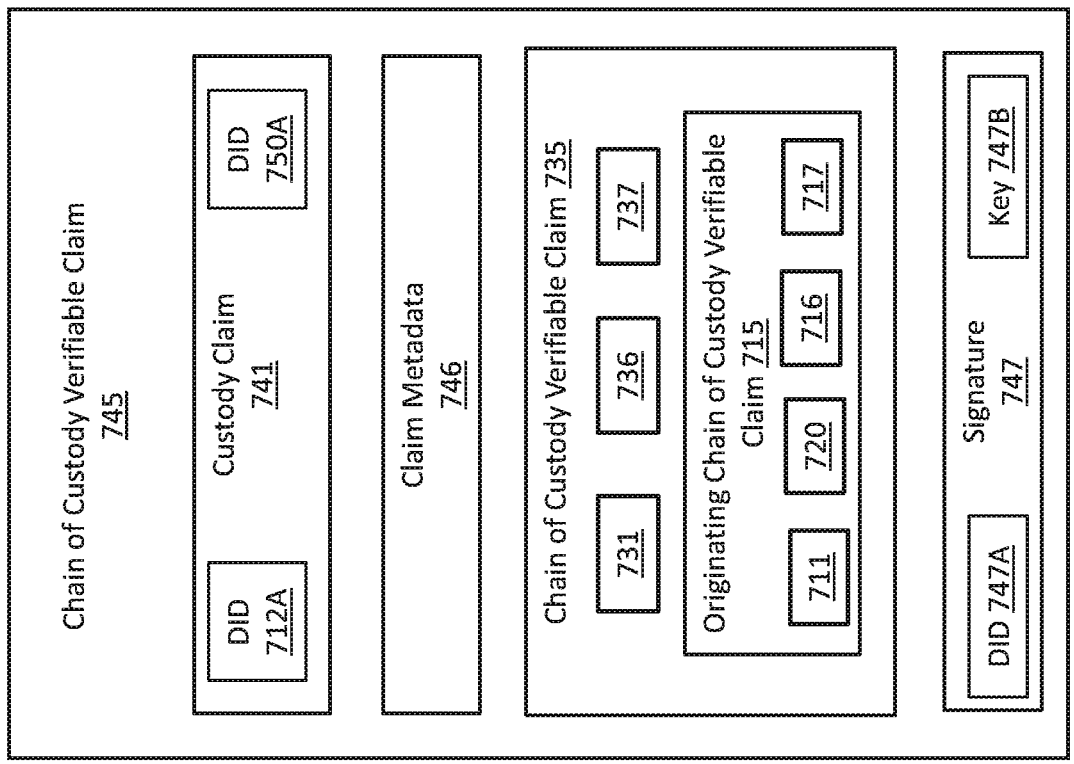
FIG. 7G illustrates an example chain of custody verifiable claim having an originating chain of custody verifiable claim and another chain of custody verifiable claim embedded therein.
Figure 7F:
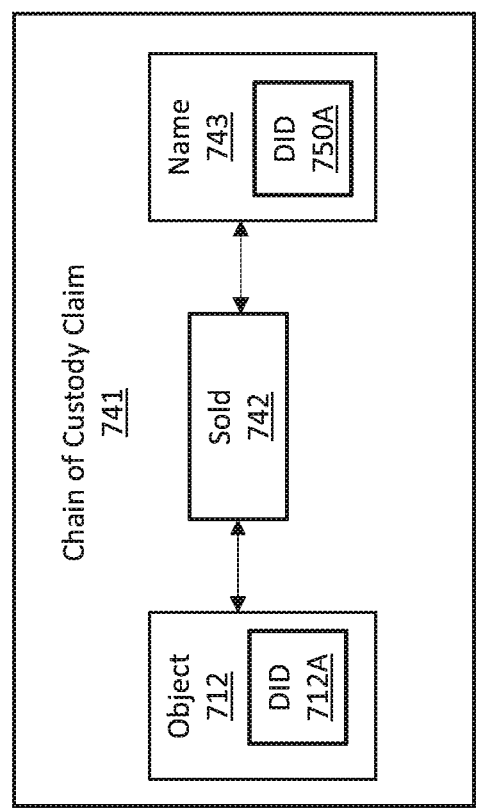
FIG. 7F illustrates another example chain of custody claim.

FIG. 7F illustrates an example data structure that represents a chain of custody claim 741 that is made by the entity 740. The chain of custody claim 741 includes the object 712 and its associated DID 712A as the subject of the claim, a property 742 that specifies that the object 712 has been sold and a value 743 that lists the name of the entity that is the object 712 is being sold to and an associated DID of that entity. In the illustrated embodiment, it is the entity 750 that the object 712 is being sold to and so the DID 750A that is associated with the entity 750 is included.

FIG. 7G illustrates an example data structure of the chain of custody verifiable claim or credential 745. The chain of custody verifiable claim or credential 745 includes the chain of custody claim 741 and includes the DID 712A of the object 712 and the DID 750A of the entity 750. In some embodiments, the chain of custody verifiable claim or credential 745 also includes various metadata 746 related to the chain of custody verifiable claim or credential 745 and which may correspond to the metadata 620 previously discussed. The chain of custody verifiable claim or credential 745 also includes or has embedded therein the chain of custody verifiable claim or credential 735. As discussed previously, the chain of custody verifiable claim or credential 735 includes or has embedded therein the originating verifiable claim or credential 715.

The chain of custody verifiable claim or credential 745 also includes a signature 747 which is generated by signing the chain of custody verifiable claim or credential 745 by a private key of the entity 740 that is associated with the DID 747A of the entity 740. The signature 747 is typically a cryptographic mechanism (such as a digital signature) that is used to detect whether the chain of custody verifiable claim or credential 745 has been tampered with since the time that the chain of custody verifiable claim or credential 745 was issued, and can be used to verify identity of the entity 740.

Once the chain of custody verifiable claim or credential 745 is generated, at least a portion of data related to the chain of custody verifiable claim or credential 745 is propagated onto a distributed ledger 760 by the computing system of the entity 740 as shown in FIG. 7A at 706, such that a relying entity can use the portion of data propagated onto the distributed ledger to verify the chain of custody verifiable claim or credential 745. For example, in some embodiments the DID 747A or the public key 747B is propagated onto the distributed ledger 760 for use in validating the chain of custody verifiable claim or credential 745. In other embodiments, a hash of the public key 747B or a hash of the chain of custody verifiable claim or credential 745 is propagated onto the distributed ledger 760.

As shown at 706 in FIG. 7A, the computing system of the entity 750 receives the chain of custody verifiable claim or credential 745 from the entity 740 once the sale of the object 712 is completed. Although not shown for ease of illustration, it will be appreciated that the entity 750 will also receive the actual object 712 from the entity 740 once the sale of the object 712 is completed since the entity 750 now owns the object 712.

Upon receipt of the chain of custody verifiable claim or credential 745, the computing system of the entity 750 can access the distributed ledger 760 as shown at 707 to verify the signature 747 using the DID 747A and/or the public key 747B to ascertain that the multiple entries on the distributed ledger 760 indicate that the signature 747 (or at least a representation of the signature 747) has been properly recorded and has not been tampered with or revoked.

Validating the signature 747 by itself would not necessarily verify that the entity 740 or the entity 730 has had proper custody of the object 712 since a fraudulent chain of custody claim may have been added into to the prior chain of custody verifiable claims or credentials. Accordingly, the computing system of the entity 750 can also access the distributed ledger as shown at 707 to verify the signature 737 of the chain of custody verifiable claim or credential 735 that is embedded in the chain of custody verifiable claim or credential 745 using the DID 737A and/or the public key 737B. In addition, the computing system of the entity 750 can also access the distributed ledger as shown at 706 to verify the signature 717 of the originating chain of custody verifiable claim or credential 715 that is embedded in the chain of custody verifiable claim or credential 735 using the DID 717A and/or the public key 717B. The successful verification of the signatures 717, 737 and 747 will verify that the entity 740 had proper custody of the object 712 at the time the chain of custody verifiable claim or credential 745 was received by the entity 750.

Figure 8:
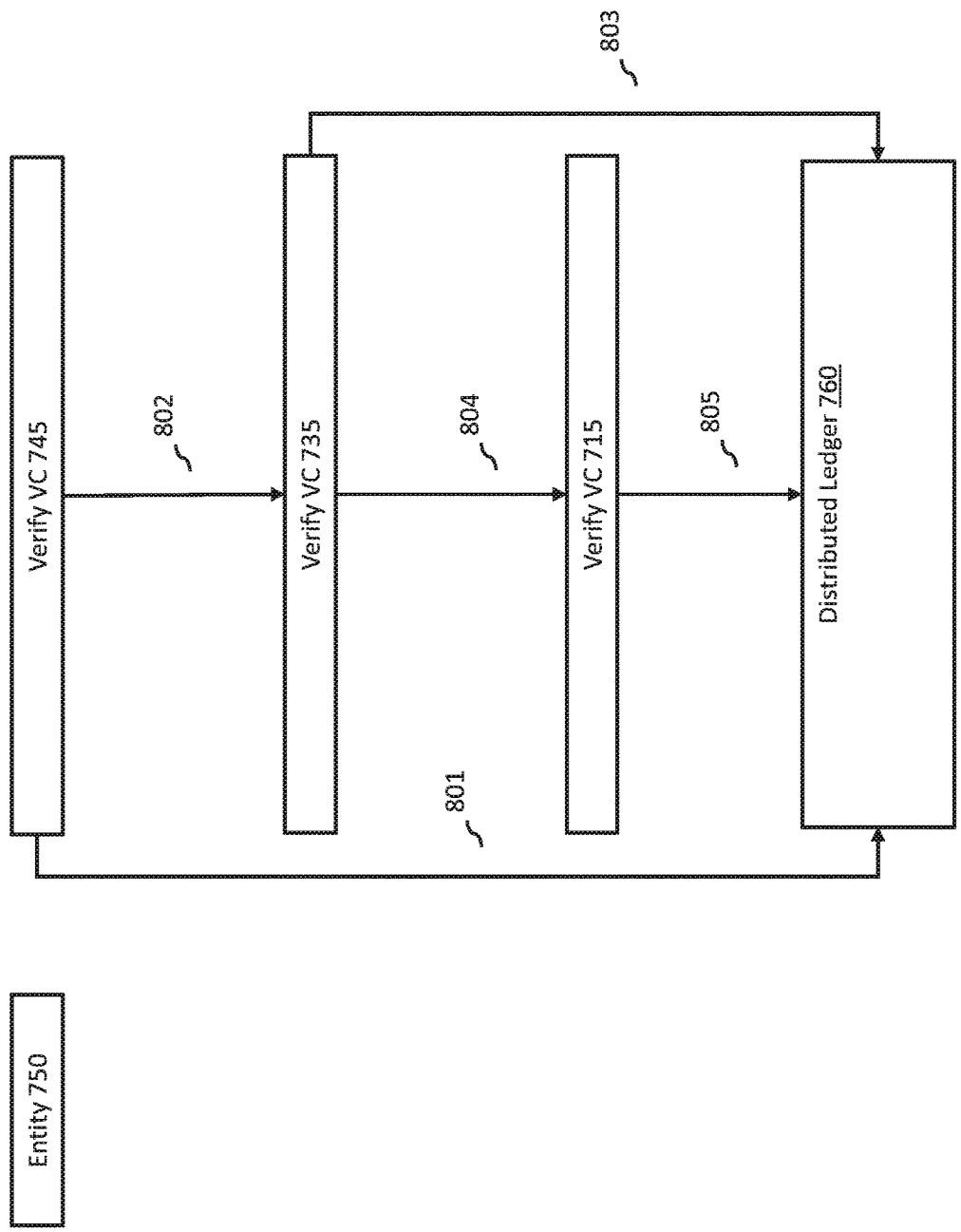
FIG. 8 illustrates an example flow of verifying multiple chain of custody verifiable claims.

FIG. 8 shows a more detailed illustration of the process flow for the entity 750 to verify or validate the various verifiable claims or credentials 715, 735, and 745. As discussed previously, the computing system of the entity 750 receives the chain of custody verifiable claim or credential 745 from the entity 730. As shown at 801, the computing system of entity 750 accesses the distributed ledger 760 to verify or validate the chain of custody verifiable claim or credential 745 in the manner previously described. Upon a successful verification or validation of the chain of custody verifiable claim or credential 745 as shown at 802, the computing system of entity 750 accesses the distributed ledger 760 to verify or validate the chain of custody verifiable claim or credential 735 that is embedded in the chain of custody verifiable claim or credential 745 in the manner previously described as shown at 803. Upon a successful verification or validation of the chain of custody verifiable claim or credential 735 as shown at 804, the computing system of entity 750 accesses the distributed ledger 760 to verify or validate the originating chain of custody verifiable claim or credential 715 that is embedded in the chain of custody verifiable claim or credential 735 in the manner previously described as shown at 805. In this way, the entity 750 is able to verify that each of the entities that have claimed to have proper custody of the object 712 at some point in time have in fact had custody. This allows the entity 750 to have confidence in the authenticity of the object 712.

Figure 7H:
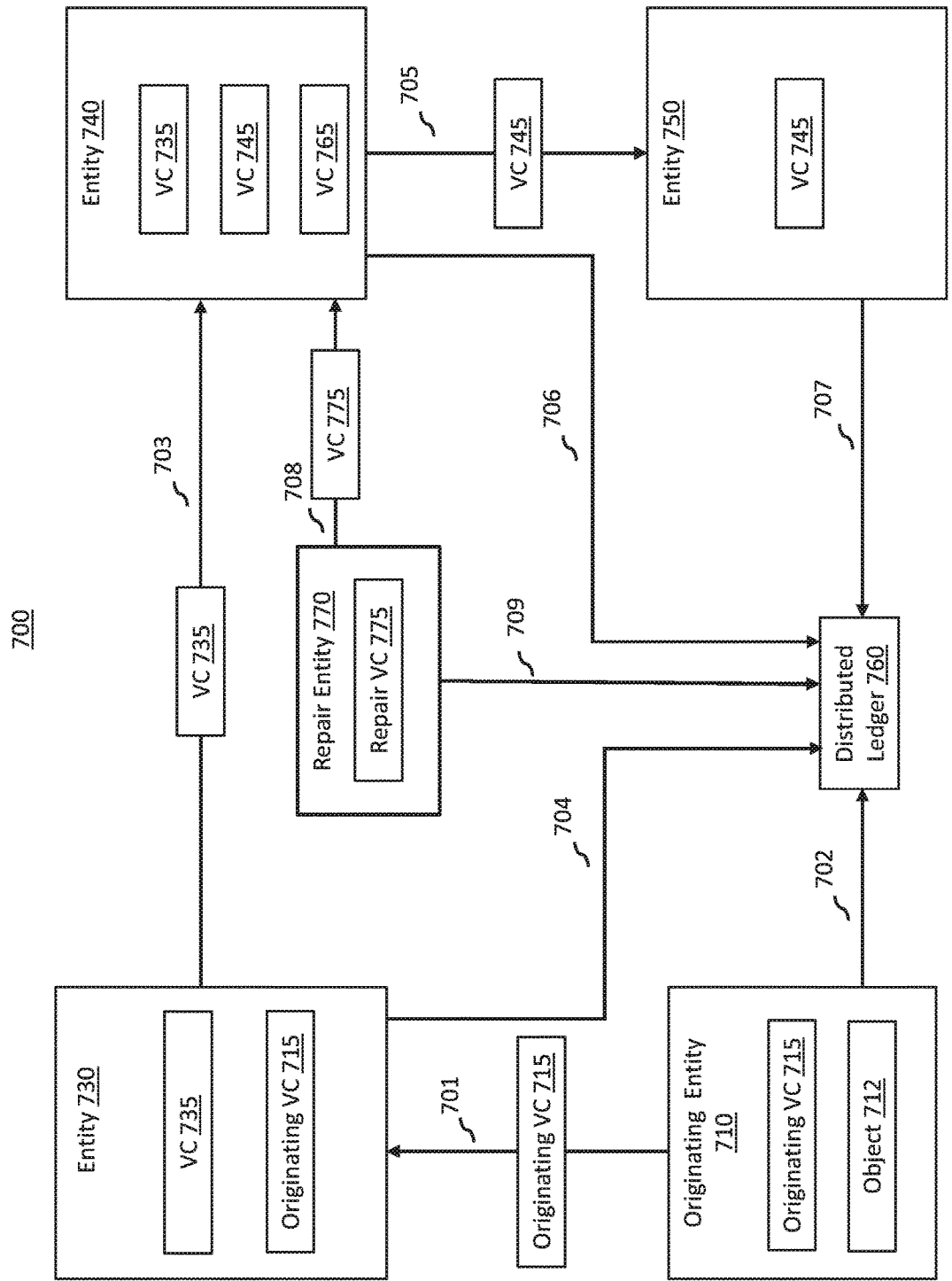
FIG. 7H illustrates an alternative embodiment of the environment of FIG. 7A.

In some embodiments, one of the entities that has custody of the object 712 may desire to perform a repair or other alteration to the object 712. For example, if the object 712 is an antique piece of furniture or an antique car, it may need to be repaired or restored so as to increase its value. Accordingly, FIG. 7H illustrates an alternative embodiment of the environment 700 that includes a repair entity 770. In the embodiment, the computing system of repair entity 770 is able to generate a repair verifiable claim or credential 775. Although not illustrated, the repair verifiable claim or credential 775 includes a claim having subject, property and value and may include claim metadata that that specifies the repair or alteration done to the object 712. A signature along with an associated DID and public key may also be included that is used to record the repair verifiable claim or credential 775 on the distributed ledger 760 as shown at 709.

The repair verifiable claim or credential 775 is the provide to the entity that initiated the repair or alteration. In the illustrated embodiment, this entity is entity 740 and the repair verifiable claim or credential 775 is provide to entity 740 as shown at 708. The repair verifiable claim or credential 775 may then be embedded in the chain of custody verifiable claim or credential 745 as shown in FIG. 7J. In this way, it is possible to include any repairs or alterations to the object 712 in the verifiable claim or credential. Although the illustrated embodiment shows the entity 740 initiating the repair or alteration, this may be done by any of the entities. In addition, in some embodiments, the repair entity 770 may be entity 740 or some other entity of the environment 700.

Figure 7I:
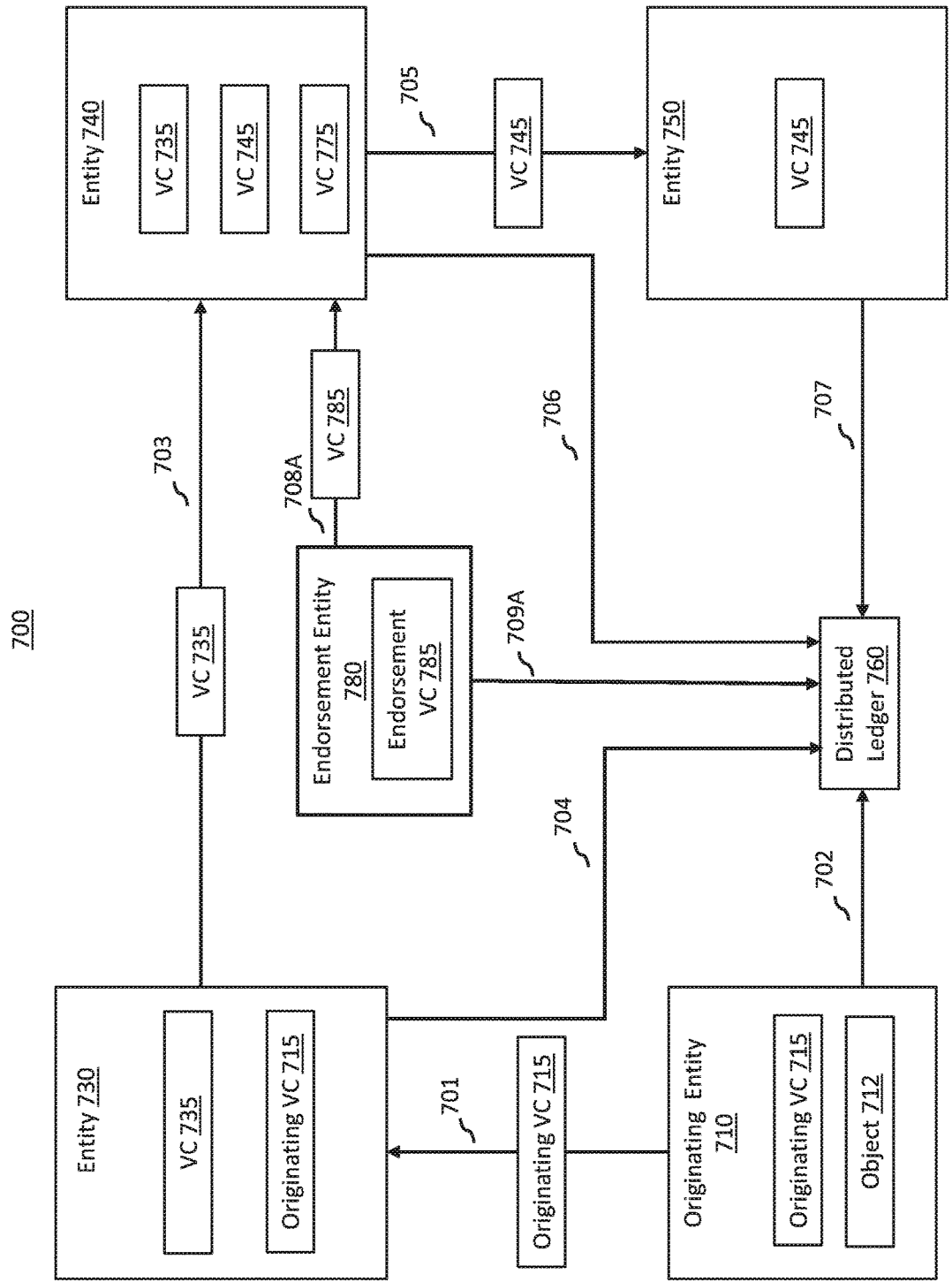
FIG. 7I illustrates an alternative embodiment of the environment of FIG. 7A.

FIG. 7I illustrates another alternative embodiment of the environment 700 that includes an endorsement entity 780. The endorsement entity 780 is typically a well-known entity that is an expert in a particular field who can be trusted by other entities because of its expertise. For example, the endorsement entity 780 may be an antique store that is well-known for making claims about antique objects.

In the embodiment, the computing system of endorsement entity 780. is able to generate an endorsement claim or credential 785. Although not illustrated, the endorsement claim or credential 785 includes a claim having subject, property and value and may include claim metadata that that specifies that the endorsement entity has established the authenticity of the object 712. A signature along with an associated DID and public key may also be included that is used to record the endorsement claim or credential 785 on the distributed ledger 760 as shown at 709A.

Figure 7K:
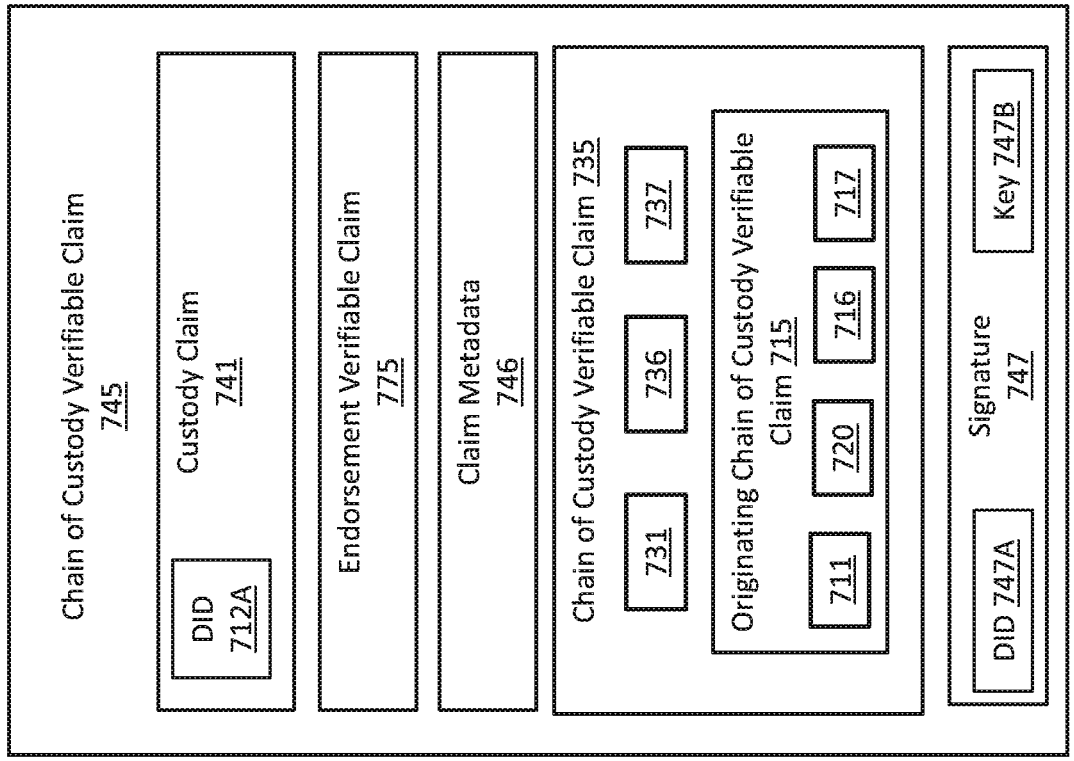
FIG. 7K illustrates an example chain of custody verifiable claim including an endorsement verifiable claim.
Figure 7J:
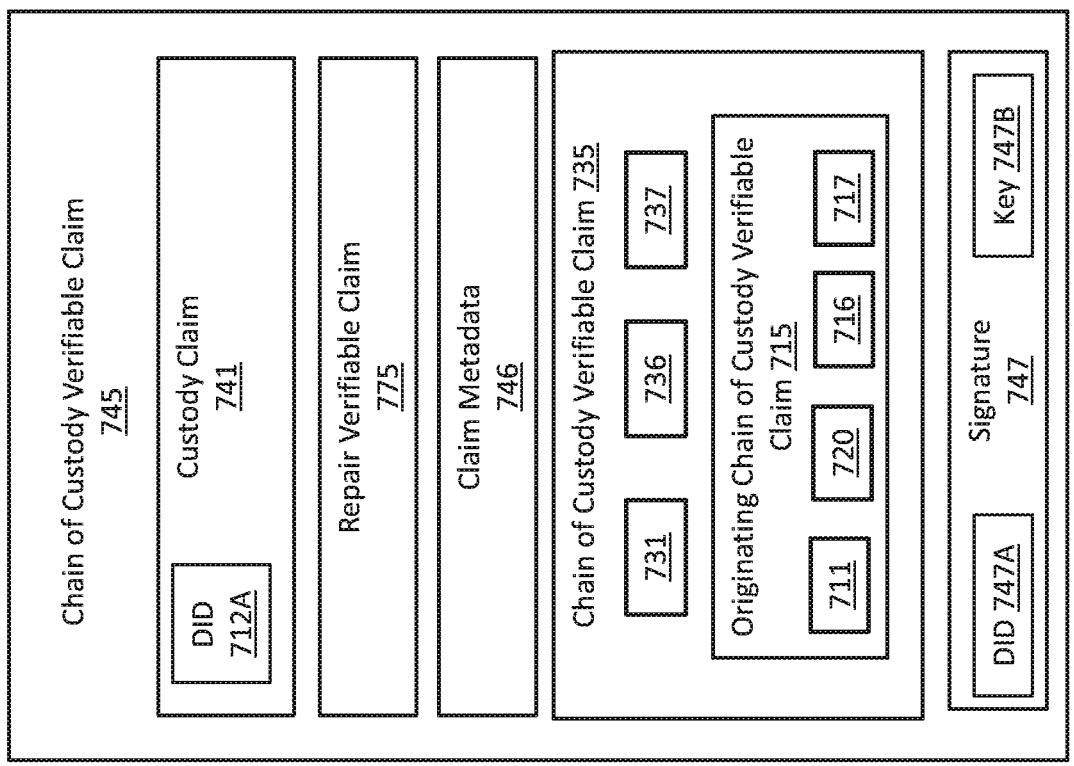
FIG. 7J illustrates an example chain of custody verifiable claim including a repair verifiable claim.

The endorsement claim or credential 785 is the provide to the entity that requested the endorsement. In the illustrated embodiment, this entity is entity 740 and the endorsement claim or credential 785 is provide to entity 740 as shown at 708A. The endorsement claim or credential 785 may then be embedded in the chain of custody verifiable claim or credential 745 as shown in FIG. 7K. The entity 750 (or any subsequent entities that receive a chain of custody verifiable claim or credential) is then able to verify the endorsement claim or credential 785 in the manner previously described using the distributed ledger 760. If the endorsement claim or credential 785 is verified or validated, then the entity 750 can trust that the object 712 is authentic. The entity 750 (or any subsequent entities that receive a chain of custody verifiable claim or credential) may not need to further verify or validate any of the other chain of custody claims or credentials since the entity 750 can be confident in the endorsement made by the endorsement entity 780. Although the illustrated embodiment shows the entity 740 requesting the endorsement claim or credential 785, this may be done by any of the entities. In addition, in some embodiments, the endorsement entity may be entity 740 or some other entity of the environment 700.

Figure 9:
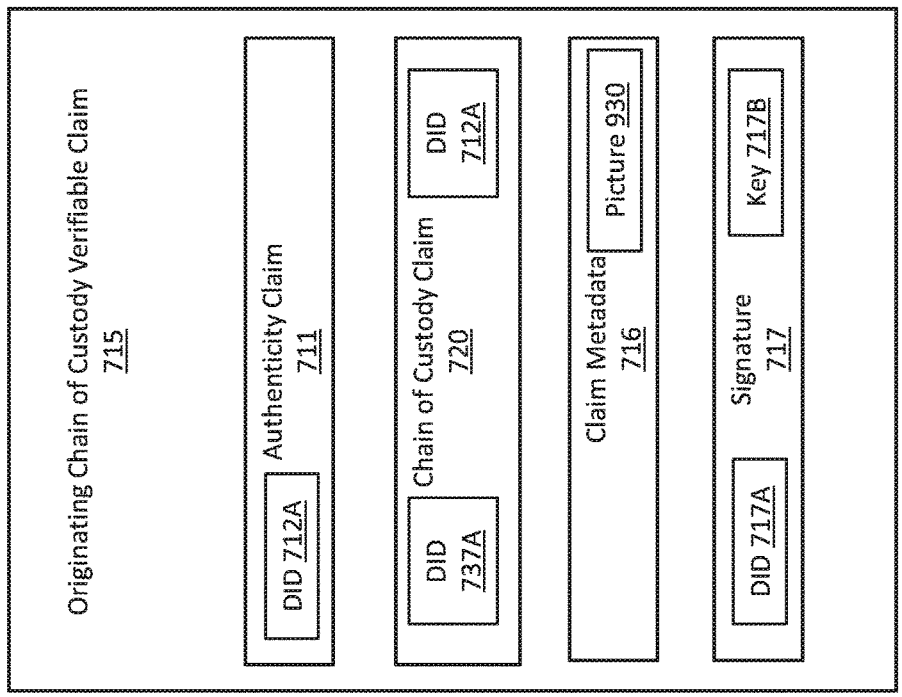
FIG. 9 illustrates alternative embodiments of an originating chain of custody verifiable claim.
Figure 9:
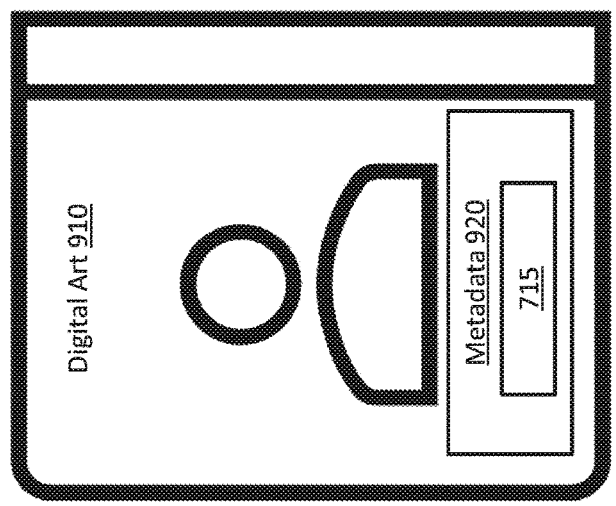

FIG. 9 illustrates an embodiment where the object 712 is a digital art piece 910. The digital art piece 910 would typically include metadata 920 that includes information about the digital art piece. Accordingly, in some embodiments originating entity 710 includes the originating chain of custody verifiable claim or credential 715 as part of the metadata 920 when selling digital art piece 910 to the entity 730. Although not illustrated, the entity 730 can then include the chain of custody verifiable claim or credential 735 in the metadata 920. This process can then be repeated by the entity 740 for the chain of custody verifiable claim or credential 745. In other embodiments, the digital art piece 910 may be included in the claim metadata 716 of the originating verifiable claim or credential 715.

FIG. 9 also illustrates an alternative embodiment of the originating verifiable claim or credential 715. In this embodiment, the originating entity 710 has included a digital picture 930 of the object 712 in the claim metadata 716. This may be useful for embodiments where the object 712 is a physical object such as an antique piece of furniture or a physical piece of artwork. By including the digital picture 930 in the claim metadata 716, an entity that obtains the object 710 subsequent to the generation of the originating chain of custody verifiable claim or credential 715 is able to compare the physical object 712 with the digital picture 930. A match will likely indicate that the object 712 is authentic and that the chain of custody has been properly maintained.

Shane

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
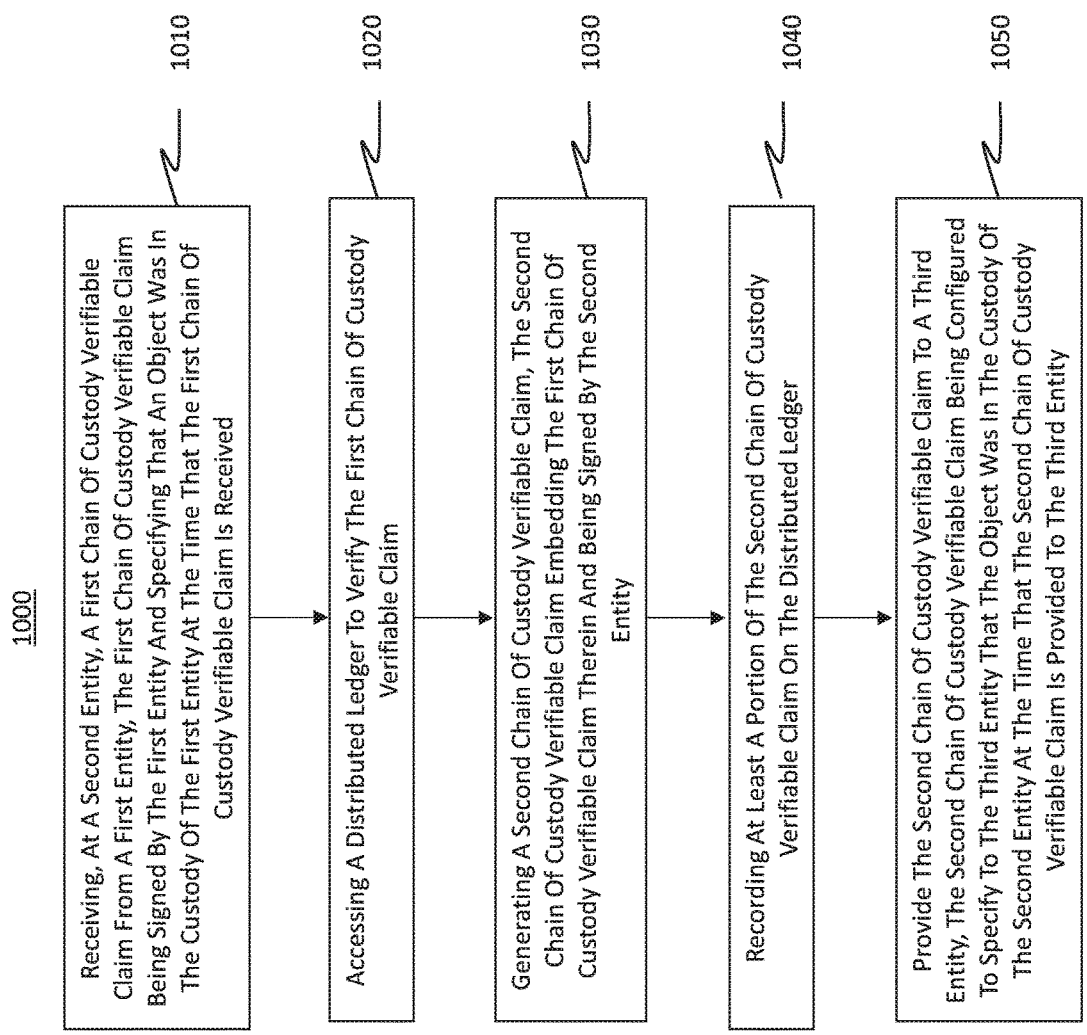
FIG. 10 illustrates a flow chart of an example method for for recording a chain of custody in a decentralized network that implements a Decentralized Identifier (DID) backed by a distributed ledger.

FIG. 10 illustrates a flow chart of an example method 1000 for recording a chain of custody in a decentralized network that implements a Decentralized Identifier (DID) backed by a distributed ledger. The method 1000 will be described with respect to one or more of FIGS. 2-9 discussed previously.

The method 1000 includes receiving, at a second entity, a first chain of custody verifiable claim from a first entity, the first chain of custody verifiable claim being signed by the first entity and specifying that an object was in the custody of the first entity at the time that the first chain of custody verifiable claim is received (1010). For example, as previously described the entity 730 may receive the originating chain of custody verifiable claim or credential 715 from the originating entity 710. The originating chain of custody verifiable claim or credential 715 includes the signature 717 of the originating entity 710 and includes the chain of custody claim 720 specifying that the object 712 was in the custody of the originating entity 710 at the time the originating chain of custody verifiable claim or credential 715 is received by the entity 730.

Alternatively, the entity 740 may receive the chain of custody verifiable claim or credential 735 from the entity 740. The chain of custody verifiable claim or credential 735 includes the signature 737 of the entity 730 and includes the chain of custody claim 731 specifying that the object 712 was in the custody of the entity 730 at the time the chain of custody verifiable claim or credential 735 is received by the entity 740.

The method 1000 includes accessing a distributed ledger to verify the first chain of custody verifiable claim 1020). For example, as previously described, the entity 730 accesses the distributed ledger 760 to verify the originating chain of custody verifiable claim or credential 715. Alternatively, the entity 740 accesses the distributed ledger 760 to verify the chain of custody verifiable claim or credential 735.

The method 1000 includes generating a second chain of custody verifiable claim, the second chain of custody verifiable claim embedding the first chain of custody verifiable claim therein and being signed by the second entity (1030). For example, as previously described the entity 730 generates the chain of custody verifiable claim or credential 735 that includes the signature 737 and the embedded originating chain of custody verifiable claim or credential 715. Alternatively, the entity 740 generates the chain of custody verifiable claim or credential 745 that includes the signature 747 and the embedded chain of custody verifiable claim or credential 735.

The method 1000 includes recording at least a portion of the second chain of custody verifiable claim on the distributed ledger (1040). For example, as previously described the entity 730 records at least a portion of the chain of custody verifiable claim or credential 735 on the distributed ledger 760. Alternatively, the entity 740 records at least a portion of the chain of custody verifiable claim or credential 745 on the distributed ledger 760.

The method 1000 includes provide the second chain of custody verifiable claim to a third entity, the second chain of custody verifiable claim being configured to specify to the third entity that the object was in the custody of the second entity at the time that the second chain of custody verifiable claim is provided to the third entity (1050). For example, as previously described the entity 730 provides the chain of custody verifiable claim or credential 735 to the entity 740 to establish a proper chain of custody for the object 712. Alternatively, the entity 740 provides the chain of custody verifiable claim or credential 745 to the entity 750 to establish a proper chain of custody for the object 712.

Figure 11:
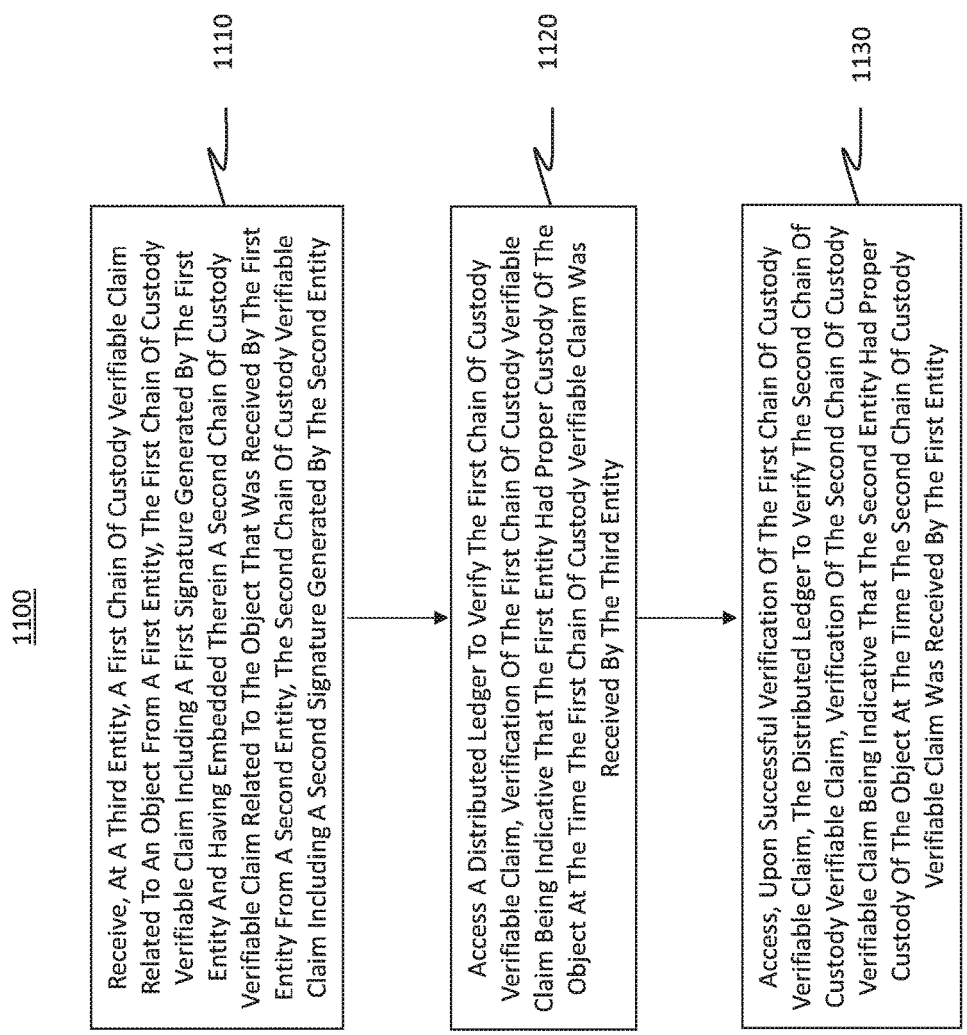
FIG. 11 illustrates a flow chart of an example method for verifying a chain of custody in a decentralized network that implements a Decentralized Identifier (DID) backed by a distributed ledger.

FIG. 11 illustrates a flow chart of an example method 1100 for verifying a chain of custody in a decentralized network that implements a Decentralized Identifier (DID) backed by a distributed ledger. The method 900 will be described with respect to one or more of FIGS. 2-9 discussed previously.

The method 1100 includes receiving, at a third entity, a first chain of custody verifiable claim related to an object from a first entity, the first chain of custody verifiable claim including a first signature generated by the first entity and having embedded therein a second chain of custody verifiable claim related to the object that was received by the first entity from a second entity, the second chain of custody verifiable claim including a second signature generated by the second entity (1110). For example, as previously described the entity 740 receives from the entity 730 the chain of custody verifiable claim or credential 735 that includes the signature 737, the chain of custody claim 731 for the object 712, and the embedded originating chain of custody verifiable claim or credential 715 that includes the signature 717 of the originating entity 710. Alternatively, the entity 750 receives from the entity 740 the chain of custody verifiable claim or credential 745 that includes the signature 747, the chain of custody claim 741 for the object 712, and the embedded chain of custody verifiable claim or credential 735 and the originating chain of custody verifiable claim or credential 715 that include the signature 737 of the entity 730 and the signature 171 of the originating entity 710, respectively.

The method 1100 includes accessing a distributed ledger to verify the first chain of custody verifiable claim, validation of the first chain of custody verifiable claim being indicative that the first entity had proper custody of the object at the time the first chain of custody verifiable claim was received by the third entity (1120). For example, as previously described the entity 740 can access the distributed ledger 760 to verify the chain of custody verifiable claim or credential 735 to establish that the entity 730 had proper chain of custody for the object 712. Alternatively, the entity 750 can access the distributed ledger 760 to verify the chain of custody verifiable claim or credential 745 to establish that the entity 740 had proper chain of custody for the object 712.

The method 1100 includes accessing, upon successful verification of the first chain of custody verifiable claim, the distributed ledger to verify the second chain of custody verifiable claim, verification of the second chain of custody verifiable claim being indicative that the second entity had proper custody of the object at the time the second chain of custody verifiable claim was received by the first entity (1130). For example, as previously described the entity 740 can access the distributed ledger 760 to verify the chain of originating custody verifiable claim or credential 715 to establish that the originating entity 710 had proper chain of custody for the object 712. Alternatively, the entity 750 can access the distributed ledger 760 to verify the chain of custody verifiable claim or credential 735 and to verify the chain of originating custody verifiable claim or credential 715 to establish that the entity 730 and the originating entity 710 had proper chain of custody for the object 712.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for verifying a chain of custody in a decentralized network that implements a Decentralized Identifier (DID) backed by a distributed ledger, the computing system comprising:
   one or more processors; and
   one or more computer-readable storage media having thereon computer-executable instructions that are structured such that, when executed by the one or more processors, cause the computing system to:
   receive, at a third entity, a first chain of custody verifiable claim related to an object from a first entity, the first chain of custody verifiable claim including a first signature generated by the first entity and having embedded therein a second chain of custody verifiable claim related to the object that was received by the first entity from a second entity, the second chain of custody verifiable claim including a second signature generated by the second entity;
   access a distributed ledger to verify the first chain of custody verifiable claim, verification of the first chain of custody verifiable claim being indicative that the first entity had proper custody of the object at a time the first chain of custody verifiable claim was received by the third entity; and access, upon successful verification of the first chain of custody verifiable claim, the distributed ledger to verify the second chain of custody verifiable claim, verification of the second chain of custody verifiable claim being indicative that the second entity had proper custody of the object at the time a second chain of custody verifiable claim was received by the first entity.

2. The computing system of claim 1, wherein the first entity is an entity that originates the chain of custody.

3. The computing system of claim 1, wherein the first entity is an entity that creates the object.

4. The computing system of claim 1, wherein the second chain of custody verifiable claim includes a claim that specifies a repair or alteration made to the object.

5. The computing system of claim 1, wherein the second chain of custody verifiable claim includes a claim made by an endorsement entity.

6. The computing system of claim 1, wherein the object is a digital object and wherein the first chain of custody verifiable claim is included in metadata of the digital object.

7. A method for recording a chain of custody in a decentralized network that implements a Decentralized Identifier (DID) backed by a distributed ledger, the method comprising:
receiving, at a third entity, a first chain of custody verifiable claim related to an object from a first entity, the first chain of custody verifiable claim including a first signature generated by the first entity and having embedded therein a second chain of custody verifiable claim related to the object that was received by the first entity from a second entity, the second chain of custody verifiable claim including a second signature generated by the second entity;
accessing a distributed ledger to verify the first chain of custody verifiable claim, verification of the first chain of custody verifiable claim being indicative that the first entity had proper custody of the object at a time the first chain of custody verifiable claim was received by the third entity; and
accessing, upon successful verification of the first chain of custody verifiable claim, the distributed ledger to verify the second chain of custody verifiable claim, verification of the second chain of custody verifiable claim being indicative that the second entity had proper custody of the object at the time a second chain of custody verifiable claim was received by the first entity.

8. The method of claim 7, wherein the first entity is an entity that originates the chain of custody.

9. The method of claim 7, wherein the first entity is an entity that creates the object.

10. The method of claim 7, wherein the second chain of custody verifiable claim includes a claim that specifies a repair or alteration made to the object.

11. The method of claim 7, wherein the second chain of custody verifiable claim includes a claim made by an endorsement entity.

12. The method of claim 7, wherein the object is a digital object and wherein the first chain of custody verifiable claim is included in metadata of the digital object.

13. The method of claim 7, wherein the first chain of custody verifiable claim includes a digital picture of the object in metadata of the first chain of custody verifiable claim.

14. A computer readable hardware storage medium having stored thereon executable code that, when executed by a processor of a computing system, cause the computing system to perform the following:
receive, at a third entity, a first chain of custody verifiable claim related to an object from a first entity, the first chain of custody verifiable claim including a first signature generated by the first entity and having embedded therein a second chain of custody verifiable claim related to the object that was received by the first entity from a second entity, the second chain of custody verifiable claim including a second signature generated by the second entity;
access a distributed ledger to verify the first chain of custody verifiable claim, verification of the first chain of custody verifiable claim being indicative that the first entity had proper custody of the object at a time the first chain of custody verifiable claim was received by the third entity;
and
access, upon successful verification of the first chain of custody verifiable claim, the distributed ledger to verify the second chain of custody verifiable claim, verification of the second chain of custody verifiable claim being indicative that the second entity had proper custody of the object at the time a second chain of custody verifiable claim was received by the first entity.

15. The computer readable storage medium of claim 14, wherein the first entity is an entity that originates the chain of custody.

16. The computer readable storage medium of claim 14, wherein the first entity is an entity that creates the object.

17. The computer readable storage medium of claim 14, wherein the second chain of custody verifiable claim includes a claim that specifies a repair or alteration made to the object.

18. The computer readable storage medium of claim 14, wherein the second chain of custody verifiable claim includes a claim made by an endorsement entity.

19. The computer readable storage medium of claim 14, wherein the object is a digital object and wherein the first chain of custody verifiable claim is included in metadata of the digital object.

20. The computer readable storage medium of claim 14, wherein the first chain of custody verifiable claim includes a digital picture of the object in metadata of the first chain of custody verifiable claim.

* * * * *